US009535671B2

(12) United States Patent
Mushano

(10) Patent No.: US 9,535,671 B2
(45) Date of Patent: Jan. 3, 2017

(54) PARALLEL DATA PROCESSING APPARATUS AND METHOD

(75) Inventor: Mitsuru Mushano, Tokyo (JP)

(73) Assignee: Mush-A Co., Ltd., Saitama (JP)

( * ) Notice: Subject to any disclaimer, the term of this patent is extended or adjusted under 35 U.S.C. 154(b) by 1116 days.

(21) Appl. No.: 13/486,876

(22) Filed: Jun. 1, 2012

(65) Prior Publication Data
US 2012/0311306 A1 Dec. 6, 2012

Related U.S. Application Data

(63) Continuation of application No. PCT/JP2010/006593, filed on Nov. 10, 2010.
(Continued)

(30) Foreign Application Priority Data

Dec. 2, 2009 (JP) .................................. 2009-274033
Sep. 7, 2010 (JP) .................................. 2010-199711

(51) Int. Cl.
*G06F 9/45* (2006.01)
*G06F 15/80* (2006.01)

(52) U.S. Cl.
CPC ............. *G06F 8/41* (2013.01); *G06F 15/8023* (2013.01)

(58) Field of Classification Search
CPC ...... G06F 9/4436; G06F 15/82; G06F 15/825; G06F 8/41; G06F 15/8023
(Continued)

(56) References Cited

U.S. PATENT DOCUMENTS 5,454,115 A * 9/1995 Okamoto ........................ 712/25
5,872,991 A * 2/1999 Okamoto et al. ............... 712/26
(Continued)

FOREIGN PATENT DOCUMENTS

JP 2003-162514 A 6/2003
JP 2005-198267 A 7/2005
(Continued)

OTHER PUBLICATIONS

Office Action issued in corresponding Taiwanese Application No. 099139370 dated Feb. 26, 2015 (8 pages).
(Continued)

*Primary Examiner* — William B Partridge
(74) *Attorney, Agent, or Firm* — Osha Liang LLP

(57) ABSTRACT

Parallelism of processing can be improved while existing software resources are utilized substantially as they are.
A data processing apparatus includes a plurality of processing units configured to process packets each including data and extended identification information added to the data, the extended identification information including identification information for identifying the data and instruction information indicating one or more processing instructions to the data, each processing unit in the plurality of processing units including: an input/output unit configured to obtain, in the packets, only a packet whose address information indicates said each processing unit in the plurality of processing units, the address information determined in accordance with the extended identification information; and an operation unit configured to execute the processing instruction in the packet obtained by the input/output unit.

2 Claims, 21 Drawing Sheets

Related U.S. Application Data

(60) Provisional application No. 61/350,408, filed on Jun. 1, 2010.

(58) Field of Classification Search
USPC .......................................................... 712/18
See application file for complete search history.

(56) References Cited

U.S. PATENT DOCUMENTS

| | | | |
|---|---|---|---|
| 6,526,500 B1* | 2/2003 | Yumoto et al. ................ | 712/25 |
| 7,356,819 B1* | 4/2008 | Ricart ...................... | G06F 9/50 |
| | | | 708/442 |
| 2005/0076188 A1* | 4/2005 | Nishikawa et al. ............ | 712/27 |
| 2005/0201288 A1* | 9/2005 | Shichiku et al. ............. | 370/235 |
| 2006/0036831 A1 | 2/2006 | Karashima et al. | |
| 2008/0248769 A1 | 10/2008 | Kondo et al. | |
| 2008/0261550 A1 | 10/2008 | Yamaguchi | |
| 2009/0063724 A1* | 3/2009 | Pechanek et al. ............. | 710/22 |

FOREIGN PATENT DOCUMENTS

| | | |
|---|---|---|
| JP | 2005-202873 A | 7/2005 |
| JP | 2005-259030 A | 9/2005 |
| JP | 2006-053662 A | 2/2006 |
| JP | 2007-193430 A | 8/2007 |
| JP | 2008-130712 A | 6/2008 |

OTHER PUBLICATIONS

Office Action issued in corresponding Japanese Application No. 2012-132973 dated Mar. 3, 2015 (2 pages).
Office Action issued in corresponding Chinese Application No. 201080055008 dated Mar. 13, 2015 (3 pages).
Office Action in counterpart Chinese Patent Application No. 201080055008.8 issued Aug. 11, 2014 (36 pages).
Office Action Issued in Japanese Application No. 2010-199711, Dated Apr. 17, 2012 (3 Pages with English Translation).
Office Action issued in corresponding Japanese Application No. 2012-132973 dated Nov. 11, 2014 (3 pages).
Hideki Hayashi et al., A Distributed Multiple-Protocol Router for All-Optical Networks, Information Processing Society of Japan report of research (2001-DSM), vol. 2001, No. 80, p. 1-6.
Takafumi Aoki et al., "Parallel Computing Architectures Using Optical Wave-Casting" Journal of Institute of Electronics, Information and Communication Engineers, vol. J79-D-I, No. 7, p. 437-445.
Doug Burger et al., Scaling to the End of Silicon with EDGE Architectures IEEE Computer, vol. 37, No. 7, pp. 45-55.
Japanese Office Action for Application No. 2010-199711, mailed on Jun. 28, 2011 (5 pages).
Japanese Office Action for Application No. 2010-199711, mailed on Nov. 15, 2011 (6 pages).
International Search Report issued in PCT/JP2010/006593, mailed on Feb. 22, 2011 (6 pages).
Written Opinion issued in PCT/JP2010/006593, mailed on Feb. 22, 2011 (3 pages).
International Search Report issued in PCT/JP2010/070097, mailed on Feb. 1, 2011 (7 pages).
Written Opinion issued in PCT/JP2010/070097, mailed on Feb. 1, 2011 (3 pages).
Patent Abstracts of Japan for Japanese Publication No. 2005-202873, publication date Jul. 28, 2005 (1 page).
Patent Abstracts of Japan for Japanese Publication No. 2007-193430, publication date Aug. 2, 2007 (1 page).
Patent Abstracts of Japan for Japanese Publication No. 2008-130712, publication date Jun. 5, 2008 (1 page).
Patent Abstracts of Japan for Japanese Publication No. 2005-198267, publication date Jul. 21, 2005 (1 page).

* cited by examiner

Fig. 5

Two-Input/One-Output Instruction

| Symbol | (Direction) | Hex | Instruction |
|---|---|---|---|
| + |  | 10H | Add A to B / B to A (A+B / B+A) |
| − | L | 12H | Subtract R from L (L−R) |
|  | R | 13H |  |
| × |  | 14H | Multiply A by B / B by A (A×B / B×A) |
| / | L | 16H | Divide L by R (L/R) |
|  | R | 17H |  |
| write | L | 18H | Write R to *L in Memory (*L←R) |
|  | R | 19H |  |
| app1 | L | 50H | Append Data of R to Data of L (L←R) |
|  | R | 51H |  |
| app2 | L | 52H | Append Data of R to Processing Instructions of L (L←R) |
|  | R | 53H |  |

One-Input/One-Output Instruction

| Symbol | (Direction) | Hex | Instruction |
|---|---|---|---|
| NOP |  | 00H | No Operation |
| read |  | 02H | Read *A from Memory |
|  |  | FFH | (null) |

| | | | | | for LOOP EXPANED PACKET SEQUNCES (5 X 1024 PACKETS) | | | | |
|---|---|---|---|---|---|---|---|---|---|
| DATA LENGTH | DATA BODY | MCE ID | PROCESSING ID | INSTRUCTION COUNT | INSTRUCTION 1 | INSTRUCTION 2 | INSTRUCTION 3 | INSTRUCTION 4 | INSTRUCTION 5 |
| 4 | dp | 1 | 1 | 2 | I5L:18H [writeL] | I4:10H [+] | null | null | null |
| 4 | (ii=)0 | 1 | 1 | 2 | I5L:18H [writeL] | I4:10H [+] | null | null | null |
| 4 | sp | 1 | 1 | 4 | I5R:19H [writeR] | I3L:16H [/L] | I2:02H [read] | I1:10H [+] | null |
| 4 | (ii=)0 | 1 | 1 | 4 | I5R:19H [writeR] | I3L:16H [/L] | I2:02H [read] | I1:10H [+] | null |
| 4 | 2 | 1 | 1 | 2 | I5R:19H [writeR] | I3R:17H [/R] | null | null | null |
| 4 | dp | 1 | 2 | 2 | I5L:18H [writeL] | I4:10H [+] | null | null | null |
| 4 | (ii=)1 | 1 | 2 | 2 | I5L:18H [writeL] | I4:10H [+] | null | null | null |
| 4 | sp | 1 | 2 | 4 | I5R:19H [writeR] | I3L:16H [/L] | I2:02H [read] | I1:10H [+] | null |
| 4 | (ii=)1 | 1 | 2 | 4 | I5R:19H [writeR] | I3L:16H [/L] | I2:02H [read] | I1:10H [+] | null |
| 4 | 2 | 1 | 2 | 2 | I5R:19H [writeR] | I3R:17H [/R] | null | null | null |
| ⋮ | ⋮ | ⋮ | ⋮ | ⋮ | ⋮ | ⋮ | ⋮ | ⋮ | ⋮ |
| 4 | dp | 1 | 1024 | 2 | I5L:18H [writeL] | I4:10H [+] | null | null | null |
| 4 | (ii=)1023 | 1 | 1024 | 2 | I5L:18H [writeL] | I4:10H [+] | null | null | null |
| 4 | sp | 1 | 1024 | 4 | I5R:19H [writeR] | I3L:16H [/L] | I2:02H [read] | I1:10H [+] | null |
| 4 | (ii=)1023 | 1 | 1024 | 4 | I5R:19H [writeR] | I3L:16H [/L] | I2:02H [read] | I1:10H [+] | null |
| 4 | 2 | 1 | 1024 | 2 | I5R:19H [writeR] | I3R:17H [/R] | null | null | null |

| BUFFER MEMORY 240 | | | |
|---|---|---|---|
| ROOT ARRAY [256] | FLAG | COUNT VALUE | PACKET |
| 0 | 0 | 0 | EMPTY |
| 1 | 0 | 0 | EMPTY |
| ⋮ | ⋮ | ⋮ | ⋮ |
| n | 1 | 4 | PACKET 2 (HASH VALUE: n) |
| n+1 | 0 | 0 | PACKET 3 (HASH VALUE: n) |
| n+2 | 0 | 0 | PACKET 4 (HASH VALUE: n) |
| n+3 | 1 | 1 | PACKET 1 (HASH VALUE: n + 3) |
| n+4 | 0 | 0 | PACKET 5 (HASH VALUE: n) |
| ⋮ | ⋮ | ⋮ | ⋮ |
| 255 | 0 | 0 | EMPTY |

FIG. 17

PACKET SEQUENCES WITH PROCESSING ID = 1 (8 PACKETS)

| | DATA LENGTH | DATA BODY | MCE ID | PROCESSING ID | INSTRUCTION COUNT | INSTRUCTION 1 | INSTRUCTION 2 | INSTRUCTION 3 | INSTRUCTION 4 | INSTRUCTION 5 |
|---|---|---|---|---|---|---|---|---|---|---|
| [P11] | 4 | D11 :dp | 1 | 1 | 2 | I17L:18H [writeL] | I16:10H [+] | | | |
| [P12] | 4 | D12 :(ii =)0 | 1 | 1 | 2 | I17L:18H [writeL] | I16:10H [+] | | | |
| [P13] | 4 | D13 :sp | 1 | 1 | 2 | IaL:52H [app2L] | I11:10H [+] | | | |
| [P14] | 4 | D14 :(ii =)0 | 1 | 1 | 2 | IaL:52H [app2L] | I11:10H [+] | | | |
| [P15] | 5 | D15 (as below) | 1 | 1 | 1 | IaR:53H [app2R] | | | | |
| [P16] | 4 | D16 :4 | 1 | 1 | 4 | I17R:19H [writeR] | I15L:16H [/L] | I14:10H [+] | I13:14H [×] | |
| [P17] | 4 | D17 :1 | 1 | 1 | 3 | I17R:19H [writeR] | I15L:16H [/L] | I14:10H [+] | | |
| [P18] | 4 | D18 :2 | 1 | 1 | 2 | I17R:19H [writeR] | I15R:17H [/R] | | | |

D15 = I17R:19H [writeR] I15L:16H [/L] I14:10H [+] I13:14H [×] I12:02H [read]

PROCESSING OF P11 AND P12 (I16)

| | DATA LENGTH | DATA BODY | MCE ID | PROCESSING ID | INSTRUCTION COUNT | INSTRUCTION 1 | INSTRUCTION 2 | INSTRUCTION 3 | INSTRUCTION 4 | INSTRUCTION 5 |
|---|---|---|---|---|---|---|---|---|---|---|
| [P 19] | 4 | dp+0 | 1 | 1 | 1 | I17L :18H [writeL] | | | | |

PROCESSING OF P13 AND P14 (I11)

| | | | | | | | | | | |
|---|---|---|---|---|---|---|---|---|---|---|
| [P 20] | 4 | sp+0 | 1 | 1 | 1 | IaL :52H [app2L] | | | | |

PROCESSING OF P20 AND P15 (Ia)

| | | | | | | | | | | |
|---|---|---|---|---|---|---|---|---|---|---|
| [P 21] | 4 | sp+0 | 1 | 1 | 5 | I17R :19H [writeR] | I15L :16H [ / L ] | I14 :10H [ + ] | I13 :14H [ × ] | I12 :02H [read] |

PROCESSING OF P21 (I12)

| | | | | | | | | | | |
|---|---|---|---|---|---|---|---|---|---|---|
| [P 22] | 4 | *(sp+0) | 1 | 1 | 4 | I17R :19H [writeR] | I15L :16H [ / L ] | I14 :10H [ + ] | I13 :14H [ × ] | |

PROCESSING OF P22 AND P16 (I13)

| | | | | | | | | | | |
|---|---|---|---|---|---|---|---|---|---|---|
| [P 23] | 4 | *(sp+0)*4 | 1 | 1 | 3 | I17R 19H [writeR] | I15L :16H [ / L ] | I14 :10H [ + ] | | |

PROCESSING OF P23 AND P17 (I14)

| | | | | | | | | | | |
|---|---|---|---|---|---|---|---|---|---|---|
| [P 24] | 4 | *(sp+0)*4 +1 | 1 | 1 | 2 | I17R :19H [writeR] | I15L :16H [ / L ] | | | |

PROCESSING OF P24 AND P18 (I15)

| | | | | | | | | | | |
|---|---|---|---|---|---|---|---|---|---|---|
| [P 25] | 4 | [*(sp+0)*4 +1]/2 | 1 | 1 | 1 | I17R :19H [writeR] | | | | |

PROCESSING OF P19 AND P25 (I17)

| | | | | | | | | | | |
|---|---|---|---|---|---|---|---|---|---|---|
| [P 26] | 4 | D26 (as below) | 1 | 1 | 0 | | | | | |

PROCESSING OF P31 AND P32 (I16)

| | DATA LENGTH | DATA BODY | EXTENSION FLAG | MCE ID | PROCESSING ID | INSTRUCTION COUNT | INSTRUCTION 1 | INSTRUCTION 2 | INSTRUCTION 3 | INSTRUCTION 4 | INSTRUCTION 5 |
|---|---|---|---|---|---|---|---|---|---|---|---|
| [P39] | INTEGER | dp+0 | 0 | 1 | 1 | 1 | I17L:18H [writeL] | I16:10H [+] | null | null | null |

PROCESSING OF P33 AND P34 (I11)

| | DATA LENGTH | DATA BODY | EXTENSION FLAG | MCE ID | PROCESSING ID | INSTRUCTION COUNT | INSTRUCTION 1 | INSTRUCTION 2 | INSTRUCTION 3 | INSTRUCTION 4 | INSTRUCTION 5 |
|---|---|---|---|---|---|---|---|---|---|---|---|
| [P40] | INTEGER | sp+0 | 1 | 1 | 1 | 0 | I11:10H [+] | null | null | null | null |

PROCESSING OF P40 AND P35 (Pa)

| | DATA LENGTH | DATA BODY | EXTENSION FLAG | MCE ID | PROCESSING ID | INSTRUCTION COUNT | INSTRUCTION 1 | INSTRUCTION 2 | INSTRUCTION 3 | INSTRUCTION 4 | INSTRUCTION 5 |
|---|---|---|---|---|---|---|---|---|---|---|---|
| [P41] | INTEGER | sp+0 | 0 | 1 | 1 | 5 | I17R:19H [writeR] | I15L:16H [/L] | I14:10H [+] | I13:14H [×] | I12:02H [read] |

PROCESSING OF P41 (I12)

| | DATA LENGTH | DATA BODY | EXTENSION FLAG | MCE ID | PROCESSING ID | INSTRUCTION COUNT | INSTRUCTION 1 | INSTRUCTION 2 | INSTRUCTION 3 | INSTRUCTION 4 | INSTRUCTION 5 |
|---|---|---|---|---|---|---|---|---|---|---|---|
| [P42] | INTEGER | *(sp+0) | 0 | 1 | 1 | 4 | I17R:19H [writeR] | I15L:16H [/L] | I14:10H [+] | I13:14H [×] | I12:02H [read] |

PROCESSING OF P42 AND P36 (I13)

| | DATA LENGTH | DATA BODY | EXTENSION FLAG | MCE ID | PROCESSING ID | INSTRUCTION COUNT | INSTRUCTION 1 | INSTRUCTION 2 | INSTRUCTION 3 | INSTRUCTION 4 | INSTRUCTION 5 |
|---|---|---|---|---|---|---|---|---|---|---|---|
| [P43] | INTEGER | *(sp+0)*4 | 0 | 1 | 1 | 3 | I17R:19H [writeR] | I15L:16H [/L] | I14:10H [+] | I13:14H [×] | I12:02H [read] |

PROCESSING OF P43 AND P37 (I14)

| | DATA LENGTH | DATA BODY | EXTENSION FLAG | MCE ID | PROCESSING ID | INSTRUCTION COUNT | INSTRUCTION 1 | INSTRUCTION 2 | INSTRUCTION 3 | INSTRUCTION 4 | INSTRUCTION 5 |
|---|---|---|---|---|---|---|---|---|---|---|---|
| [P44] | INTEGER | *(sp+0)*4 +1 | 0 | 1 | 1 | 2 | I17R:19H [writeR] | I15L:16H [/L] | I14:10H [+] | I13:14H [×] | I12:02H [read] |

PROCESSING OF P44 AND P38 (I15)

| | DATA LENGTH | DATA BODY | EXTENSION FLAG | MCE ID | PROCESSING ID | INSTRUCTION COUNT | INSTRUCTION 1 | INSTRUCTION 2 | INSTRUCTION 3 | INSTRUCTION 4 | INSTRUCTION 5 |
|---|---|---|---|---|---|---|---|---|---|---|---|
| [P45] | INTEGER | [*(sp+0)*4 +1]/2 | 0 | 1 | 1 | 1 | I17R:19H [writeR] | I15L:16H [/L] | I14:10H [+] | I13:14H [×] | I12:02H [read] |

PROCESSING OF P39 AND P45 (I17)

| | DATA LENGTH | DATA BODY | EXTENSION FLAG | MCE ID | PROCESSING ID | INSTRUCTION COUNT | INSTRUCTION 1 | INSTRUCTION 2 | INSTRUCTION 3 | INSTRUCTION 4 | INSTRUCTION 5 |
|---|---|---|---|---|---|---|---|---|---|---|---|
| [P46] | INTEGER | D26 (as below) | 0 | 1 | 1 | 0 | I17L:18H [writeL] | I16:10H [+] | null | null | null |

PARALLEL DATA PROCESSING APPARATUS AND METHOD

CROSS-REFERENCE TO RELATED APPLICATIONS

This application claims the benefit of priority to Japanese Patent Application Nos. 2009-274033, 2010-199711, and U.S. Provisional Patent Application 61/350,408 filed Dec. 2, 2009, Sep. 7, 2010, Jun. 1, 2010, respectively, of which full contents are incorporated herein by reference.

TECHNICAL FIELD

The present invention relates to a data processing apparatus, a data processing system, a packet, a processing medium, a storage device, and a data processing method.

BACKGROUND ART

As computer architecture, the von Neumann architecture is generally known in which instructions are sequentially fetched from a storage device (memory), decoded, and executed. This von Neumann architecture is a processing system with emphasis on instructions, in which an execution sequence of the instructions is determined in advance and processing is performed while operands (data to be calculated) are collected each time.

Further, in von Neumann computers, as CPU (Central Processing Unit) architecture that performs parallel processing of a plurality of instructions, superscalar processers are known. The superscalar processor is capable of out-of-order processing in which an instruction is issued to an execution node in the order of arrival of the operands, to be executed. However, in the superscalar processors, since a scheduler rearranges execution results in a right order while inspecting data dependency, an increase in the number of instructions that can be executed at the same time causes complication of the scheduler.

On the other hand, as non-von Neumann architecture, data-driven architecture is known, in which the data dependency is focused and processing is performed in accordance with a data flow (flow of data). This data-driven architecture is capable of processing many instructions in parallel by firing at the point of the time when the operands are ready in the execution node and by transferring the execution result of the instruction to the subsequent execution node.

For example, in Patent Document 1, a multi-processor system is disclosed in which the data-driven (data flow machine type in Patent Document 1) architecture is used for control between processors and the Neumann architecture is used for control in the processor, respectively. This multi-processor system is capable of performing parallel processing on the basis of the executable code generated by being divided into threads using the data-driven architecture and the Neumann architecture in combination without using a complicated hardware configuration.

Furthermore, for example, in Non-patent Document 1, TRIPS (Tera-op Reliable Intelligently Advanced Processing System) architecture is disclosed. This TRIPS architecture is a combination of chip architecture called tile processor and ISA (Instruction Set Architecture) called EDGE (Explicit Data Graph Execution). Among them, the tile processor is capable of keeping an operation speed high even if the number of cores is increased, by wiring only between the adjacent cores, so as to avoid a problem of wiring delay. On the other hand, the EDGE architecture aims at maximizing parallelism of processing by statically arranging the instructions in the execution node and executing them at the point of the time when the operands are ready in the execution node, similarly to the data flow architecture.

As such, a plurality of instructions can be processed in parallel by using the computer architectures as described above singly or in combination.

CITATION LIST

Patent Literature

PTL 1: Japanese Laid-Open Patent Publication No. 2007-193430

Non Patent Literature

NPL 1: Doug Burger, et al., "Scaling to the End of Silicon with EDGE Architectures," IEEE Computer, vol. 37, no. 7, pp. 44-55, July 2004

SUMMARY OF INVENTION

Technical Problem

A parallel computer is capable of parallel processing of many instructions by using the data-driven architecture. However, since the data-driven architecture uses an instruction set different from that of the von Neumann architecture, existing software resources for the von Neumann computer cannot be used as they are.

In order to use the existing software resources in the parallel computer, a compiler technology for generating an executable code for the parallel computer from a source program for the von Neumann computer is required, for example. However, parallelism of processing in a case where the compiler technology is used depends on the performances of the compiler, and improvement of the parallelism involves complication of the compiler and even causes an increase of compiling time. Further, in Patent Document 1, in order to generate the executable code for the multi-processor system using a program processing device, thread description needs to be added in advance to the source program described in a high-level language such as C language.

Also, for example, an interpreter technology is required that executes the source program for the von Neumann computer while sequentially interpreting. However, similarly to the compiler technology, improvement of the parallelism of processing involves complication of the interpreter, and might deteriorate an operation speed of the interpreter. Moreover, even though the complication of the compiler or the interpreter is not involved, complication of the parallel computer itself or deterioration in the operation speed might be caused.

Thus, the improvement of parallelism in the parallel computer is in a trade-off relationship with occurrence of cost rise in order to use the existing software resources in the parallel computer.

Solution to Problem

A main aspect of the invention for solving the foregoing issue is a data processing apparatus including a plurality of processing units configured to process packets each including data and extended identification information added to the data, the extended identification information including identification information for identifying the data and instruction information indicating one or more processing instructions to the data, each processing unit in the plurality of processing units including: an input/output unit configured to obtain, in the packets, only a packet whose address information indicates said each processing unit in the plurality of processing units, the address information determined in accordance with the extended identification information; and an operation unit configured to execute the processing instruction in the packet obtained by the input/output unit.

Other features of the present invention will become apparent from descriptions of this specification and of the accompanying drawings.

Advantageous Effects of Invention

According to the present invention, the parallelism of processing can be improved while the existing software resources are utilized substantially as they are.

BRIEF DESCRIPTION OF DRAWINGS

FIG. 5 is a diagram illustrating an example of an instruction set to be used in a data processing apparatus.

FIG. 8 is a diagram illustrating an example of expanded-loop packet sequences generated by an MCE (memory control element).

FIG. 11 is a diagram illustrating an example of a hash table to be implemented on a buffer memory.

FIG. 17 is a diagram illustrating an example of expanded-loop packet sequences including execution of an instruction addition instruction.

FIG. 18 is a diagram illustrating an operation of a data processing apparatus including execution of an instruction addition instruction.

FIG. 21 is a diagram illustrating an operation of a data processing apparatus including an instruction addition processing.

DESCRIPTION OF EMBODIMENTS

At least the following details will become apparent from descriptions of this specification and of the accompanying drawings.

Outline of Configuration of Entire Data Processing System

An outline of a configuration of an entire data processing system including a data processing apparatus will be described hereinafter referring to FIG. 2.

Figure 2:
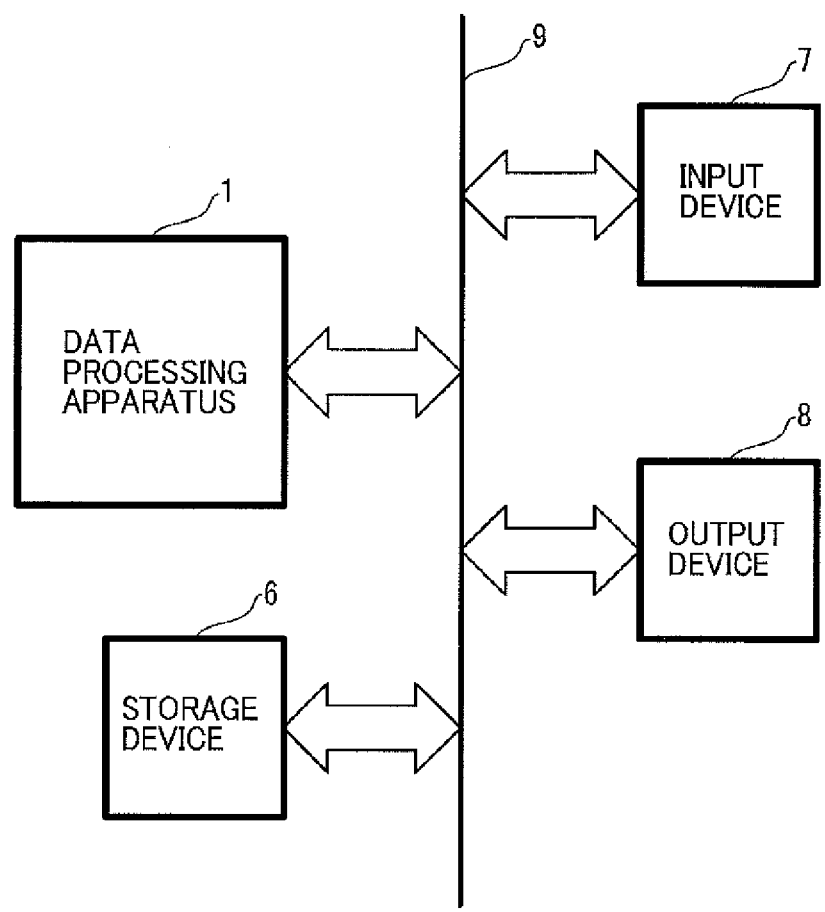
FIG. 2 is a block diagram illustrating an outline of a configuration of an entire data processing system including a data processing apparatus.

The data processing system illustrated in FIG. 2 is a parallel computer system which includes a data processing apparatus 1 and, in addition to the data processing apparatus 1, includes a storage device 6, an input device 7, an output device 8, and a bus 9. The data processing apparatus 1, the storage device 6, the input device 7 and the output device 8 are connected to on another through the bus 9. Detailed description will be given later of a configuration of the data processing apparatus 1.

Outline of Operation of Entire Data Processing System

Subsequently, an outline of an operation of the entire data processing system will be described.

The storage device 6 includes a RAM (Random Access Memory), a ROM (Read Only Memory) and the like, and a program (executable code), data to be used for executing the program and the like are stored therein. Also, the data processing apparatus 1 corresponds to a CPU of a computer system, and executes a program stored in the storage device 6. Detailed description of the operation of the data processing apparatus 1 will be given later.

The input device 7 includes a keyboard, a mouse and the like, and inputs information including data and programs (source program or executable code) to the data processing system from outside. On the other hand, the output device 8 includes a display, a printer and the like, and outputs the information to the outside as characters, images and the like.

The classification of the above data processing apparatus 1, the storage device 6, the input device 7, and the output device 8 is not fixed. For example, an auxiliary storage device such as hard disc drive, an optical disc drive or the like is used as the storage device 6, but may be classified as the input device 7 and the output device 8 that input/output information to/from the outside.

Configuration of Data Processing Apparatus

A configuration of the data processing apparatus according to an embodiment of the present invention will hereinafter be described referring to FIG. 3.

Figure 3:
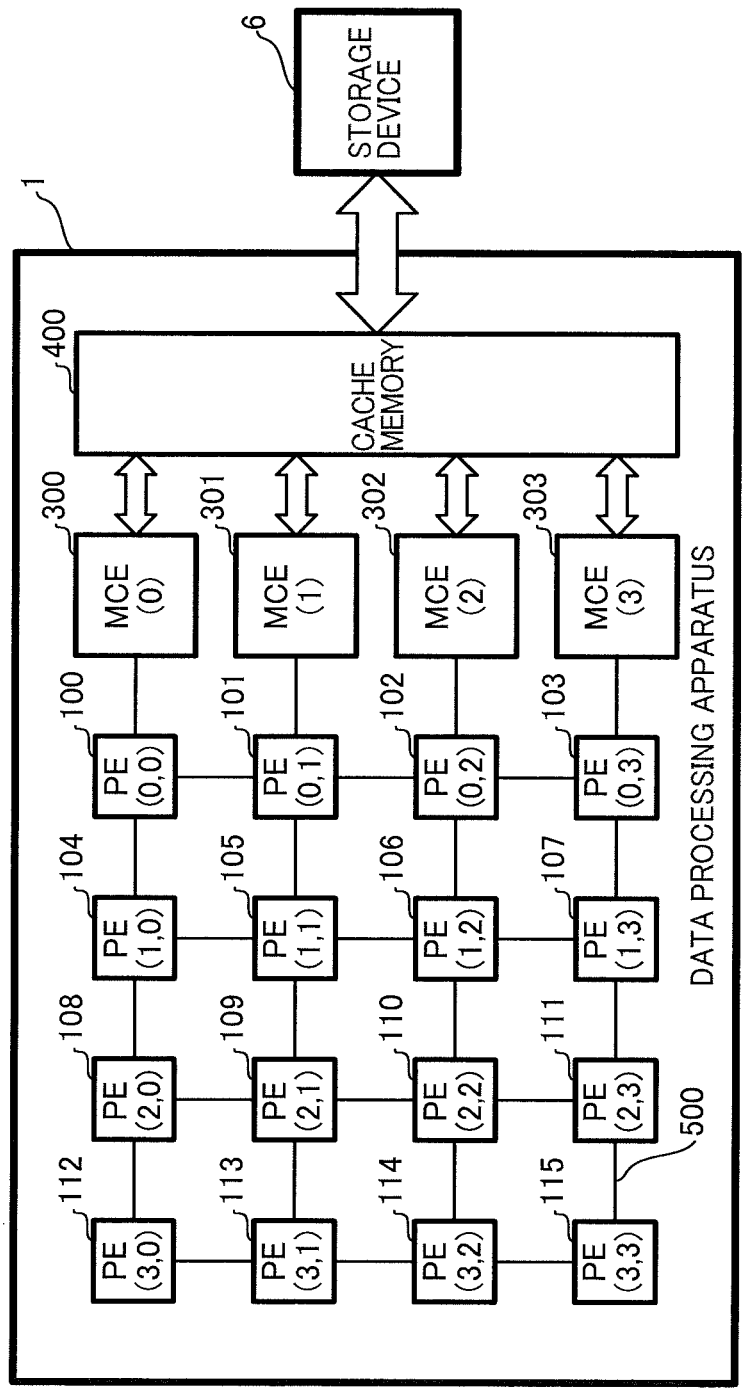
FIG. 3 is a block diagram illustrating a configuration of a data processing apparatus according to an embodiment of the present invention.

The data processing apparatus 1 illustrated in FIG. 3 includes a PE (Processor/Processing Element) 100 to 115, MCE (Memory Control/Controlling Element) 300 to 303, a cache memory 400, and a communication channel (transmission channel) 500.

The data processing apparatus 1 includes a plurality of PEs, each corresponding to a processing unit, and PEs are connected to one another through the communication channels 500. In an embodiment of the present invention, it is assumed as an example that the data processing apparatus 1 includes 16 PEs 100 to 115 arranged in a matrix manner with 4 rows and 4 columns. Also, similarly to the above-described tile processor, it is assumed that the PEs 100 to 115 are connected to on another only among the PEs adjacent to one another. Detailed description of a configuration of each PE will be given later.

Here, assuming that coordinates (X, Y) of the PEs 100 to 115 are expressed as (0, 0) to (3, 3), as illustrated in FIG. 3, respectively, then, an identification number can be set to each PE with higher two bits representing the X coordinate and lower two bits representing the Y coordinate. Also, the identification number set as above coincides with the lower two digits in a three-digit symbol of each PE illustrated in FIG. 3. For example, the identification number of PE 103 located at the coordinates (0, 3) is 3 (0011 in binary notation), while the identification number of PE 112 located at the coordinates (3, 0) is 12 (1100 in binary notation).

The data processing apparatus 1 includes at least one MCE corresponding to a control unit, and each MCE is connected to any one of PEs 100 to 115 through the communication channel 500. In an embodiment of the present invention, it is assumed as an example that the data processing apparatus 1 includes four MCEs 300 to 303. Also, the MCEs 300 to 303 are connected to the adjacent PEs 100 to 103, respectively. As illustrated in FIG. 3, identification numbers from 0 to 3 are set to the MCEs 300 to 303, respectively.

The cache memory 400 is connected to the MCEs 300 to 303. Also, the cache memory 400 is connected to the storage device 6 outside the data processing apparatus 1 through the above-described bus 9 (not shown).

Example of Configuration and Operation of Communication Channel

Figure 13:
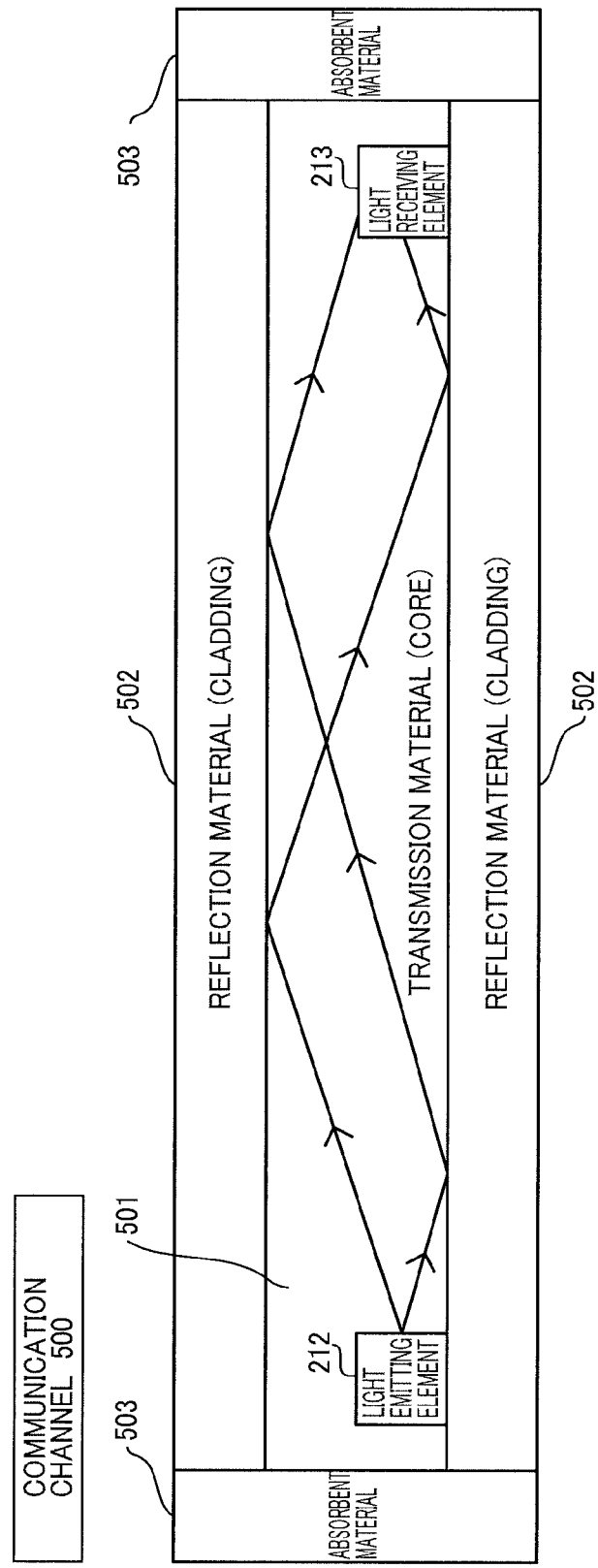
FIG. 13 is a diagram illustrating an example of a configuration of a communication channel when transmitting information using an electromagnetic wave (light).

The communication channel 500 is an information transmission medium between PEs and between the PE and the MCE, and such information transmission includes not only transmission of an electric signal through electric wiring but also transmission of an optical signal through an optical fiber and transmission of an electromagnetic wave in a free space. Here, an example of a configuration of the communication channel 500 when the information is transmitted through the electromagnetic wave or particularly light is shown in FIG. 13. In this case, each PE includes at least one transmission unit including a light emitting element and at least one receiving unit including a light receiving element. Also, in FIG. 13, a light emitting element 212 is included in the PE at an information transmission source, while a light receiving element 213 is included in the PE at an information transmission destination.

The communication channel 500 illustrated in FIG. 13 includes a transmission material 501 that allows light to pass therethrough, a reflection material 502 that reflects light, and an absorbent material 503 that absorbs light. The transmission material 501 and the reflection material 502 correspond to a core and a cladding in an optical fiber, respectively, and quartz glass or plastic or the like is used. Also, a configuration is such that the refractive index of the transmission material 501 is set higher than the refractive index of the reflection material 502 and the optical signal is fully reflected by the reflection material 502 while being transmitted through the transmission material 501.

The light receiving element 213 is configured so as to receive light having a wavelength that is set to each PE using an OCF (On-chip color Filter) or the like. In this case, the wavelength of the light emitted by the light emitting element 212 is rendered variable and is allowed to coincide with the wavelength that is set to the PE at the transmission destination, so that packets can be transmitted. Also, by switching a plurality of the light emitting elements for emitting light with different wavelengths, the wavelengths that are set to the PEs at the transmission source and the transmission destination can be coincided and the packets can be transmitted.

The wavelength set to each PE may be any one from the ultraviolet region to the infrared region. However, the wavelength in a range from the visible region to the infrared region is preferably used since the ultraviolet rays are absorbed and transmittance is deteriorated depending on the material used for the transmission material 501 and the reflection material 502.

Operation of Data Processing Apparatus

Subsequently, an operation of the data processing apparatus according to an embodiment of the present invention will be described by referring to FIGS. 4 to 8 as appropriate.

The cache memory 400 controls input/output between the MCEs 300 to 303 and the storage device 6 while caching. Therefore, the programs and data stored in the storage device 6 are read by the MCEs 300 to 303 through the cache memory 400.

Figure 4:
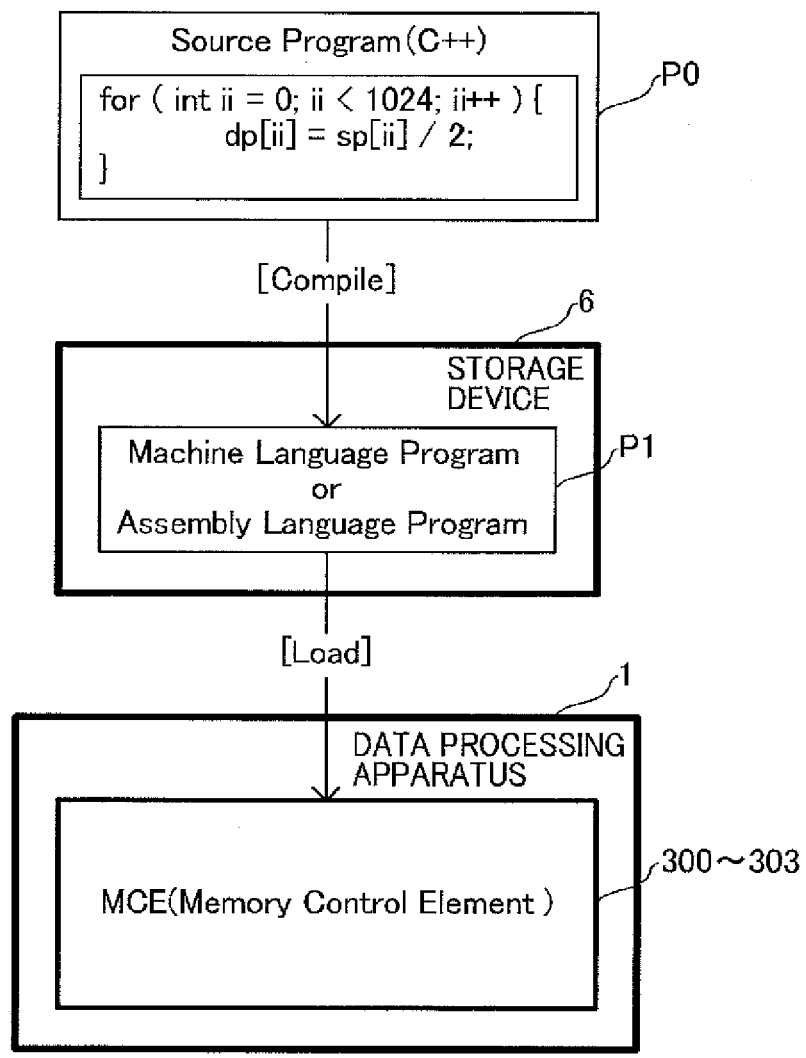
FIG. 4 is a diagram illustrating an example of a relationship between a source program and a program (executable code) to be processed by a data processing apparatus.

Here, an example of the relationship between the source program and the program processed by the data processing apparatus 1 (executable code) is shown in FIG. 4. A source program P0 written in a high-level language is compiled into an executable code P1 in advance and then, stored in the storage device 6, and the MCEs 300 to 303 read the executable code P1. In FIG. 4, as an example of the source program P0, illustrated is processing of storing a value, obtained by dividing by 2 each element in an array sp[1024] written in C++ language, in an array dp[1024]. Also, the executable code P1 may be a program written in an assembly language substantially in a one-to-one correspondence with a machine language, instead of a machine-language program.

The MCEs 300 to 303 generate sequences of packets, which will be described later, from the read-in executable code P1 on the basis of a data flowchart. Each MCE does not have to generate the data flowchart itself, but in an embodiment of the present invention, for convenience of explanation, it is assumed that the data flowchart is generated first, and then, the sequences of packets are generated on the basis of the data flowchart.

Here, an example of an instruction set to be used in the data processing apparatus 1 is shown in FIG. 5. In FIG. 5, instructions are roughly divided into a two-input/one-output instruction and a one-input/one-output instruction. Among them, the two-input/one-output instruction is an instruction for performing a binary operation where inputted two pieces of data are designated as left-hand operand and right-hand operand, respectively. On the other hand, the one-input/one-output instruction is an instruction for performing a unary operation where one inputted data is designated as operand. Also, as shown in FIG. 5, a symbol corresponding to an operator and a hexadecimal notation in machine language are set to each instruction, and they are used in the description of the data flowchart and the sequences of packets.

First, the two-input/one-output instruction will be described.

The symbol "+" and the hexadecimal notation 10H are set to an addition instruction for outputting an addition result (A+B or B+A) of two pieces of data (A and B). On the other hand, in the case of a subtraction instruction for outputting a subtraction result (L−R) of two pieces of data (L and R), since subtraction is a non-commutative operation where the commutative law does not hold, right-and-left information (direction information), indicating which of the left-hand operand or the right-hand operand each piece of data is to be designated as, is required. Thus, for the symbol "−" corresponding to the subtraction instruction, the right-and-left information "L" or "R" is further added, and the hexadecimal notations 12H and 13H are respectively set thereto.

The right-and-left information "L" indicates data to be designated as the left-hand operand, while the right-and-left information "R" indicates data to be designated as the right-hand operand. Also, in the instruction set, the LSB (Least Significant Bit) of each instruction is allocated exclusively to the right-and-left information. Therefore, in the following instructions (except the null character), the LSB of the instruction including the right-and-left information "L" and the instruction not including the right-and-left information is set to 0, while the LSB of the instruction including the right-and-left information "R" is set to 1.

The symbol "x" without the right-and-left information and the hexadecimal notation 14H are set to a multiplication instruction for outputting a multiplication result (A×B or B×A) of two pieces of data (A and B). On the other hand, the symbols "/L" and "/R" having the right-and-left information added thereto and the hexadecimal notations 16H and 17H are set to a division instruction for outputting a division result (L/R) of two pieces of data (L and R).

A writing instruction, to which symbols "writeL" and "writeR" having the right-and-left information added thereto and the hexadecimal notations 18H and 19H are set, is an instruction for writing data (R) in data (*L) stored in an address of the storage device 6 indicated by data (L). "*" is an indirect reference operator.

A data addition instruction, to which symbols "app1L" and "app1R" having the right-and-left information added thereto and the hexadecimal notations 50H and 51H are set, is an instruction for adding a data section of a packet (R) to a data section of a packet (L), which will be described later. Also, an instruction addition instruction, to which symbols "app2L" and "app2R" having the right-and-left information added thereto and the hexadecimal notations 52H and 53H are set, is an instruction for adding a data section of the packet (R) to a processing instruction section of the packet (L), which will be described later.

Subsequently, the one-input/one-output instruction will be described. Since in the one-input/one-output instruction only one data is designated as operand, no instruction includes the right-and-left information.

An NOP instruction, to which the symbol "NOP" and the hexadecimal notation O0H are set, is an instruction for doing nothing. Also, a reading instruction, to which the symbol "read" and the hexadecimal notation 02H are set, is an instruction for reading data (*A) stored at an address of the storage device 6 indicated by the data (A). Although it is not an instruction, the hexadecimal notation FFH, for example, is set as a null character that indicates the end of a packet.

Figure 6:
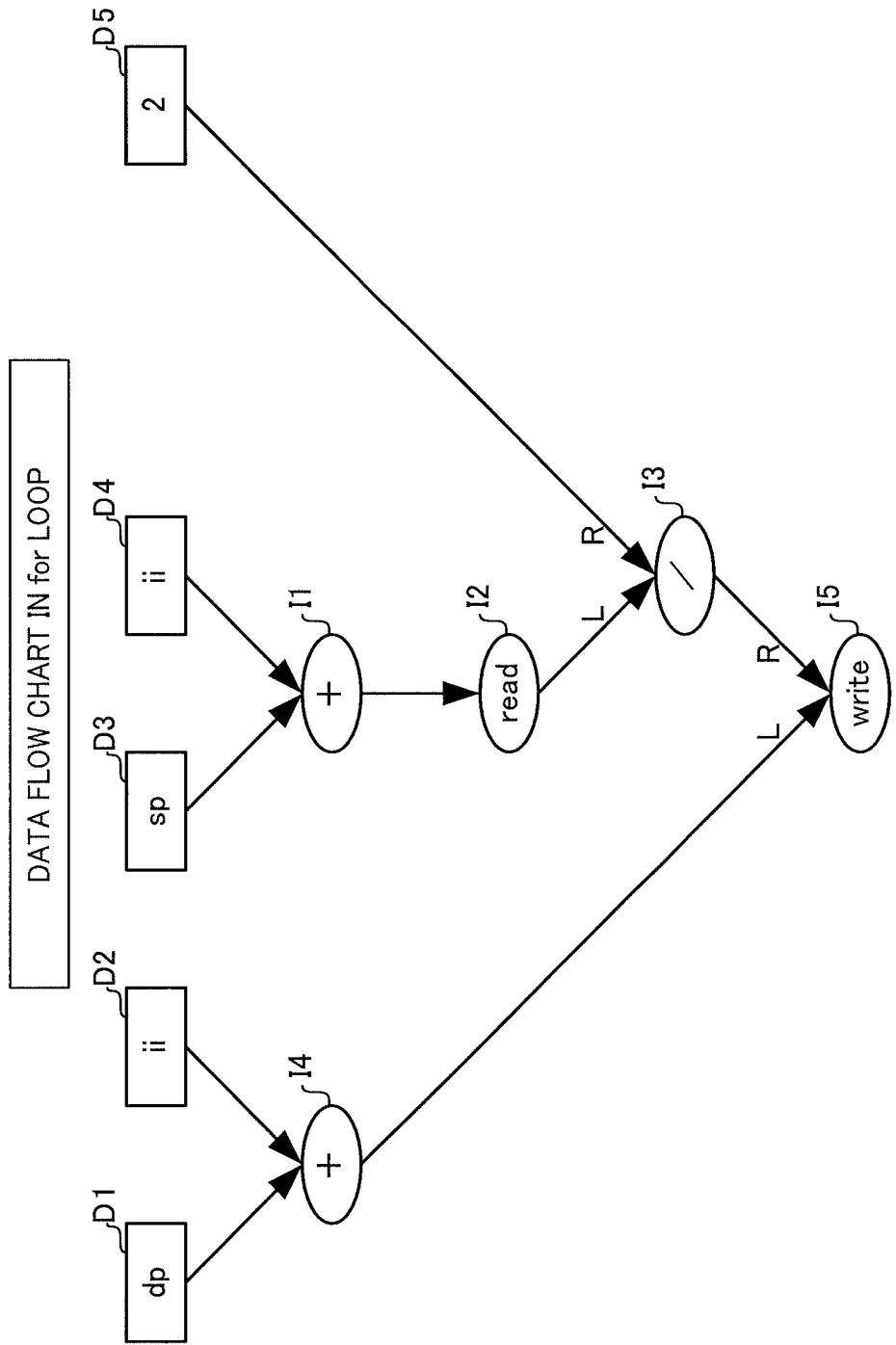
FIG. 6 is a diagram illustrating an example of a data flowchart generated by an MCE (memory control element).

Each MCE generates a data flowchart using the instruction set illustrated in FIG. 5 similarly to the case of a common data-driven architecture. FIG. 6 illustrates a data flowchart generated from the executable code P1, which corresponds to processing in a for loop of the source program P0 illustrated in FIG. 4.

In FIG. 6, D1 to D5 represent data, while I1 to I5 represent instructions. The addition instruction I4 adds the data D1(dp) and the data D2(ii) and outputs data dp+ii, while the addition instruction I1 adds the data D3(sp) and the data D4(ii) and outputs data sp+ii. Also, the reading instruction I2 reads data *(sp+ii) from the storage device 6. Further, the division instruction I3 divides the data *(sp+ii) by the data D5 (2) and outputs data *(sp+ii)/2. The writing instruction I5 writes the data *(sp+ii)/2 in the data *(dp+ii) of the storage device 6.

Figure 7:
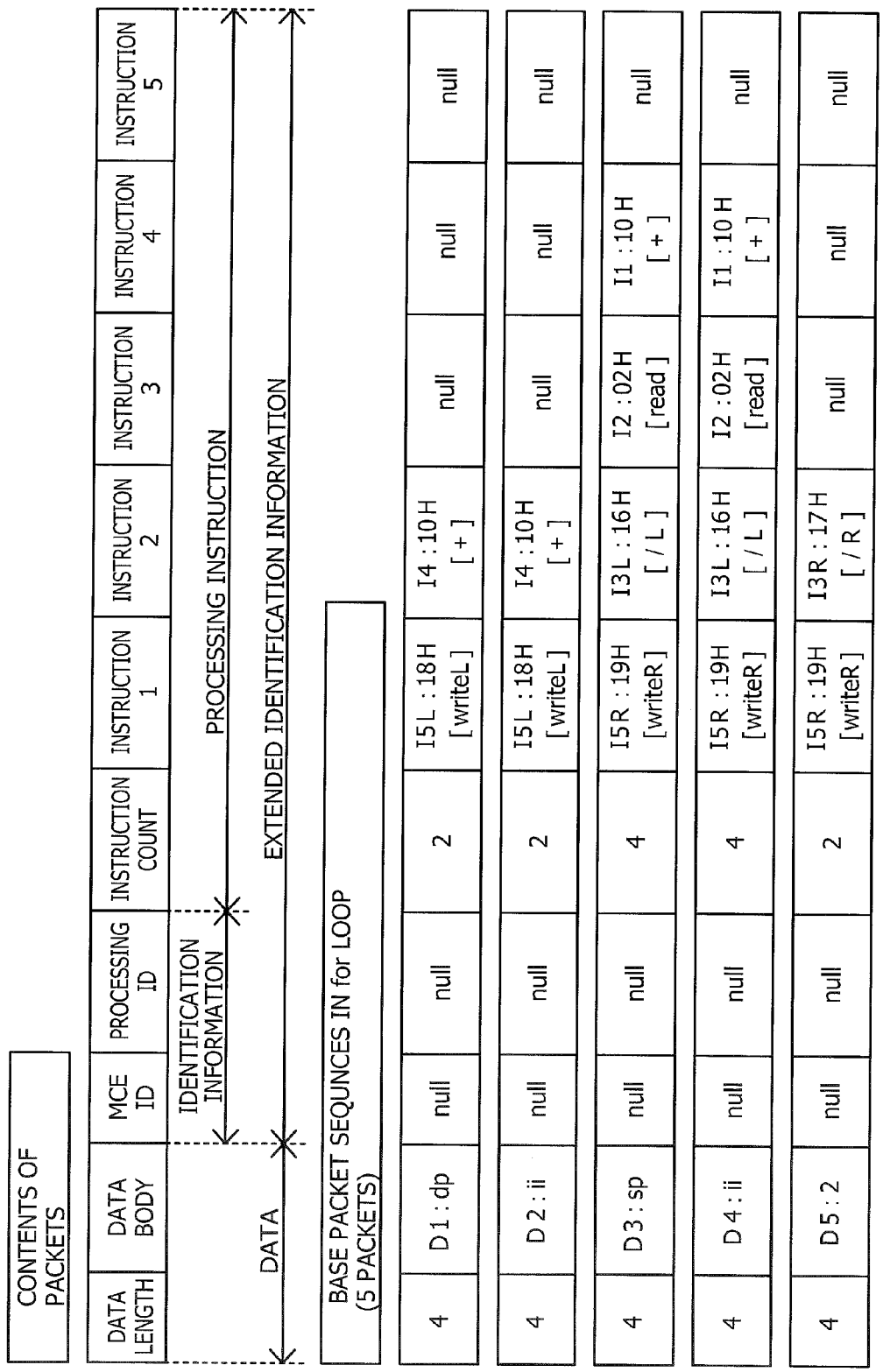
FIG. 7 is a diagram illustrating an example of base packet sequences generated by an MCE (memory control element).

Through the above dataflow, a value, which is obtained by dividing one element in the array sp[1024] by 2, is stored in the array dp[1024]. FIG. 7 illustrates base packet sequences generated on the basis of the data flowchart illustrated in FIG. 6.

Each packet includes a data section and an extended identification information section. Also, the extended identification information section includes an identification information section and a processing instruction section. Each packet may be encoded as appropriate for the purpose of encryption, compression, and the like.

The data section includes data length information of the data in addition to the data body. Also, the data length information indicates the number of bytes of the data, for example, but is not required if the data processing apparatus 1 uses only fixed-length data.

The identification information section includes an MCE ID and a processing ID, for example. In these IDs, since the processing ID is set to each base packet sequence, it is empty (null character) in FIG. 7 and is set when the for loop is unwound. On the other hand, the MCE ID corresponds to issuer information indicating the MCE that has generated the base packet sequences, and the identification numbers of 0 to 3 shown in FIG. 3 are used, for example. Also, the base packet sequences, as shown in FIG. 7, may be such that the MCE ID is rendered empty, as shown in FIG. 7, and the MCE ID is set together with the processing ID when the for loop is expanded.

In an embodiment according to the present invention, as an example, the processing instruction section includes not only up to five instructions 1 to 5 but also instruction count information. The instructions each are arranged in the order opposite to the order of the execution, in which the instruction to be executed first is arranged at the end and the subsequent instructions are empty. Moreover, the instruction count information indicates the number of unprocessed instructions but it may be counted each time.

As obvious from FIG. 7, the base packet sequences are obtained by reconfiguring the data flowchart shown in FIG. 6 by each of five data D1 to D5, and each packet is generated by adding the identification information and the processing instruction to the data. Moreover, each MCE expands a control instruction to the base packet sequences such as repetition processing, and then issues each packet to the adjacent PE. FIG. 8 shows the sequences of packets after the for loop has been expanded with respect to the base packet sequences shown in FIG. 7.

As shown in FIG. 4, since the for loop is repetition processing from ii=0 to ii=1023, 5×1024 packets are generated by the expansion. Also, as shown in FIG. 8, every five packets include the same processing ID in the IDs from 1 to 1024, and the five packets correspond to the base packet sequences shown in FIG. 7, respectively. FIG. 8 illustrates that the MCE ID is set to 1, as an example, so that it is indicated that the packets are generated by the MCE 301.

Each packet issued from the MCE 301 is transmitted, through the communication channel 500, to the PE indicated by the address information, which will be described later, in the PEs from the PE 100 to the PE 115. Also, each PE corresponds to the execution node that executes the processing instruction included in the packet. Detailed description of the operation of each PE will be described later.

As mentioned above, the data processing apparatus according to an embodiment of the present invention is greatly different from the above-described conventional computer architecture in such a point that the packet, in which the data to be designated as operand and an instruction to be designated as an operator are integrated, is to be processed.

The data processing apparatus of the present invention is not limited to the configuration including the MCE that generates the sequences of packets from the executable code P1 written in the machine language or the assembly language, as shown in an embodiment of the present invention.

For example, in the storage device 6, a program expressed by a syntax tree may be stored as an intermediate code generated in an intermediate stage during compilation from the source program P0 to the executable code P1. Since the syntax tree has a tree structure in which the operand is arranged at a leaf node and an operator is arranged at an internal node, generation of the data flowchart is easier than that in the case of the machine language or the assembly language.

Also, for example, in the storage device 6, base packet sequences or expanded-loop packet sequences generated in advance by an external device including a compiler may be stored. If the base packet sequences are stored therein, each MCE expands a control instruction to the read-in base packet sequences, sets the MCE ID and the processing ID thereto, and then issues each packet to the adjacent PE. On the other hand, if the expanded-loop packet sequences are stored therein, each MCE can issue each packet, as it is, to the adjacent PE.

Also, for example, in the storage device 6, sequences of interim packets, in which a part or the whole of the identification information section in the expanded-loop packet sequences is omitted or rendered as a null character, may be stored. In this case, each MCE sets the omitted MCE ID or processing ID and then, issues each packet to the adjacent PE.

Moreover, for example, expanded-loop packet sequences may be directly inputted from an external device into the data processing apparatus. The external device in this case can include other data processing apparatuses operating in parallel.

Figure 14:
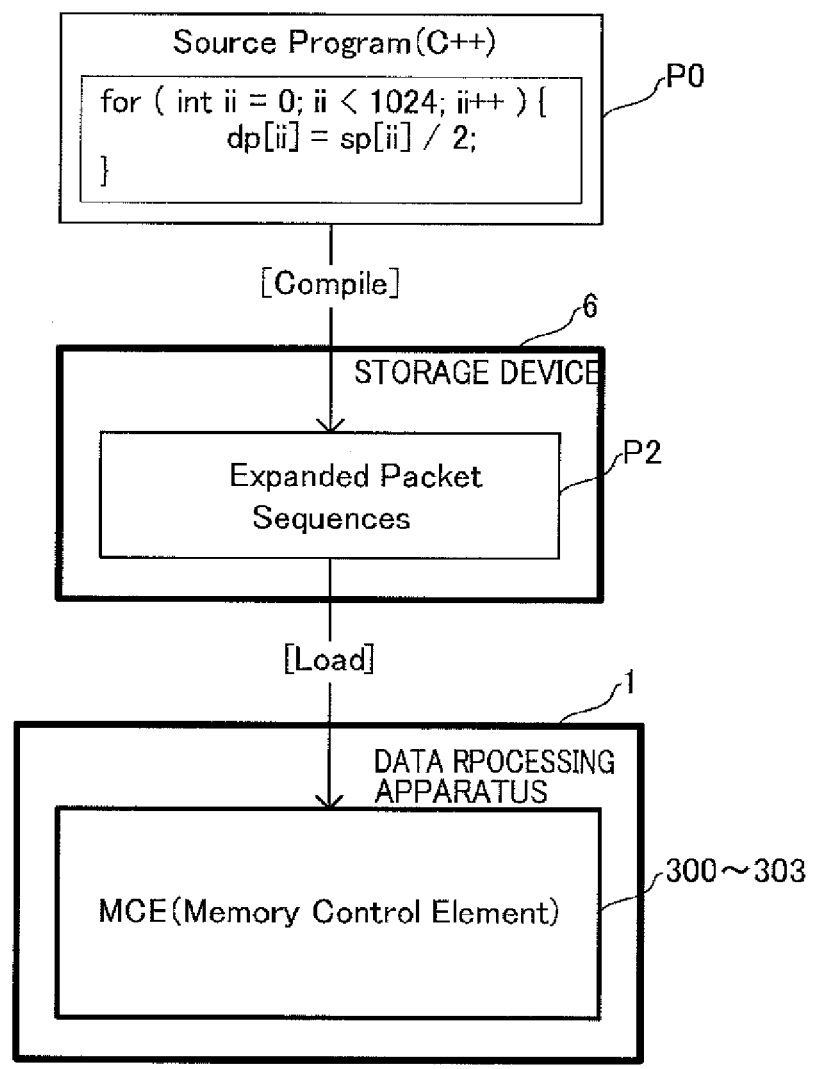
FIG. 14 is a diagram illustrating another example of a relationship between a source program and a program processed by a data processing apparatus (executable code).

Here, another example of the relationship between the source program and the program to be processed by the data processing apparatus 1 (executable code) is shown in FIG. 14. In this case, the compiler generates base packet sequences from the source program P0 written in a high-level language on the basis of the data flowchart, and further, expands the control instruction to the base packet sequences. Also, in the storage device 6, the expanded-loop packet sequences are encoded as appropriate, and then stored as an executable code P2. Then, the MCEs 300 to 303 read the executable code P2.

Configuration of PE (Processing Element)

The configuration of the PE according to an embodiment of the present invention will hereinafter be described referring to FIG. 1.

Figure 1:
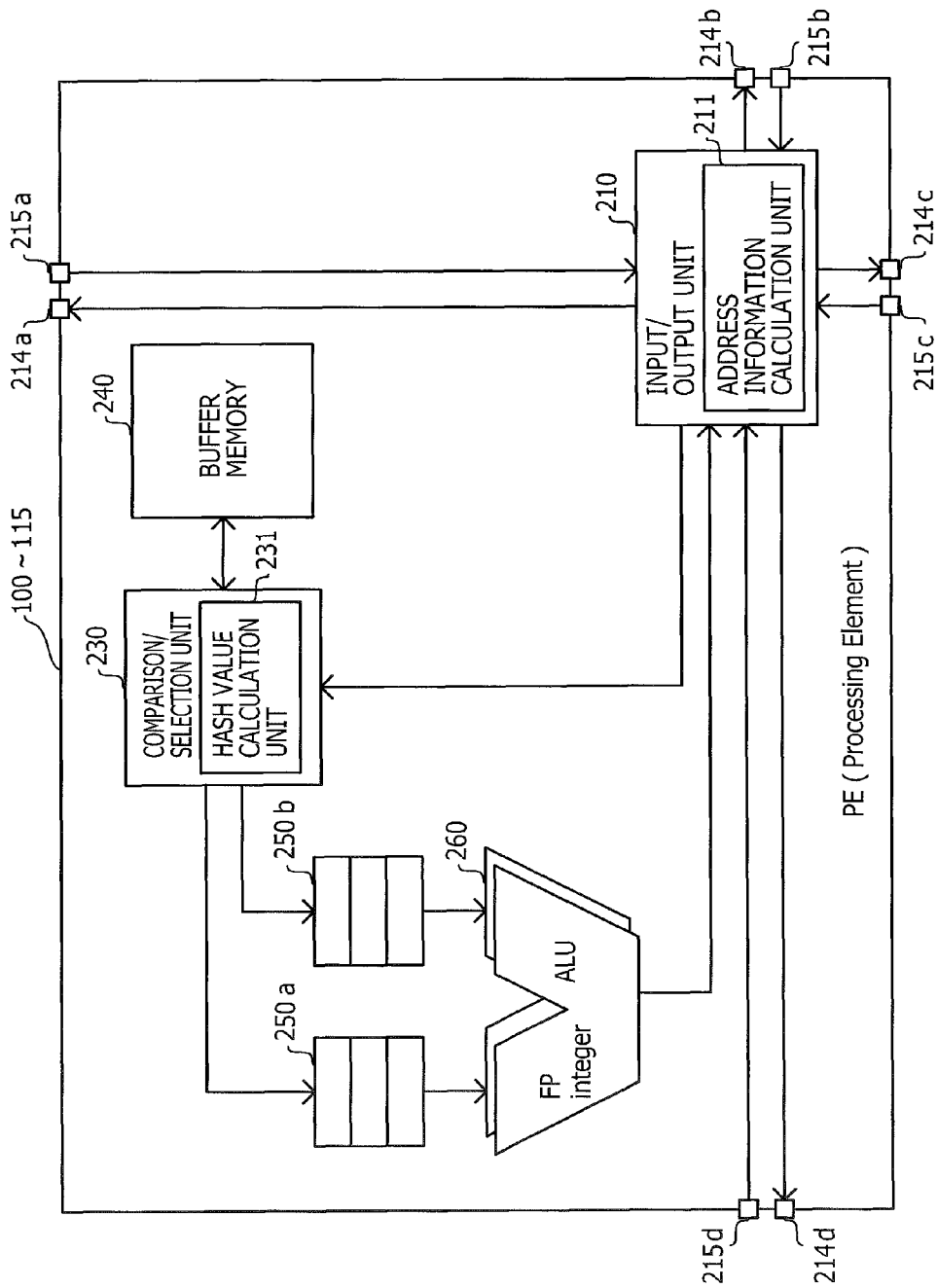
FIG. 1 is a block diagram illustrating a configuration of PE (processing element) according to an embodiment of the present invention.

The PEs 100 to 115 illustrated in FIG. 1 each include an input/output unit 210, a comparison/selection unit 230, a buffer memory 240, operand buffers 250a and 250b, and an ALU (Arithmetic Logic Unit) 260.

The input/output unit 210 includes an address information calculation unit 211, output ports 214a to 214d, and input ports 215a to 215d. Also, packets and data read from the storage device 6 are inputted to the input/output unit 210 through input ports. Further, packets and data written in the storage device 6 are outputted from the input/output unit 210 through output ports. And each of input/output ports (input port and output port) is connected to the adjacent PE and MCE through the above-described communication channel 500 (not shown).

For example, in the case of the PE 110 in FIG. 3, four pairs of the input/output ports are connected to the PEs 109, 106, 111, and 114, respectively. Also, in the case of the PE 100, for example, two pairs of the input/output ports are connected to the PEs 101 and 104, respectively, one pair of the input/output ports is connected to the MCE 300, and one pair of the input/output ports is not used.

Figure 15:
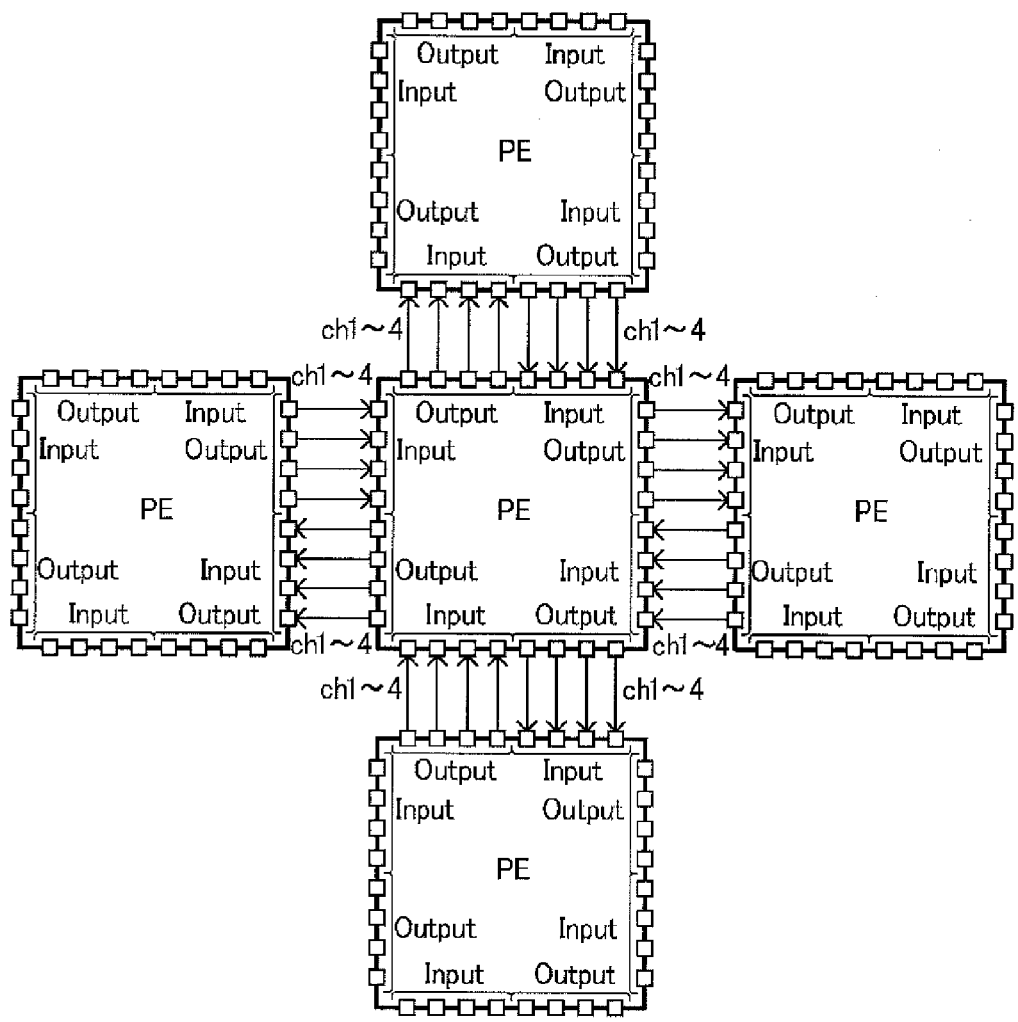
FIG. 15 is a block diagram illustrating an outline of a configuration of a PE (processing element) in which each input/output port includes a plurality of channels.

Also, for example, as shown in FIG. 15, a configuration may be such that each of the input/output ports includes a plurality of channels, and packets and data are inputted and/or outputted between the adjacent PEs and between the PE and the MCE using the plurality of channels.

In the case of information transmission using light, for example, the light emitting element 212 in FIG. 13 is provided at each output port and the light receiving element 213 at each input port.

Packets are inputted from the input/output unit 210 to the comparison/selection unit 230. Also, the comparison/selection unit 230 includes a hash value calculation unit 231 and inputs/outputs packets to/from the buffer memory 240 which corresponds to the storage unit. Further, from the comparison/selection unit 230, the packets including data to be designated as the left-hand operand and the right-hand operand, respectively, are inputted to the ALU 260, which corresponds to an operation unit, through the operand buffers 250a and 250b. And the packets newly generated by the ALU 260 are inputted to the input/output unit 210 again.

Operation of PE (Processing Element)

Subsequently, an operation of the PE according to an embodiment of the present invention will be described referring to FIGS. 9 to 11 as appropriate.

In the input/output unit 210, first, the address information calculation unit 211 calculates the inputted address information of the packet. The address information is information indicating the PE which should process the packet and can be acquired from the extended identification information section of the packet. Here, referring to FIG. 9, a description will be given of the method for calculating the address information of the first five packets with the MCE ID=1 and the processing ID=1 in FIG. 8. It is hereinafter assumed as shown in FIG. 9 that the five packets are designated as packets P1 to P5, respectively.

Figure 9:
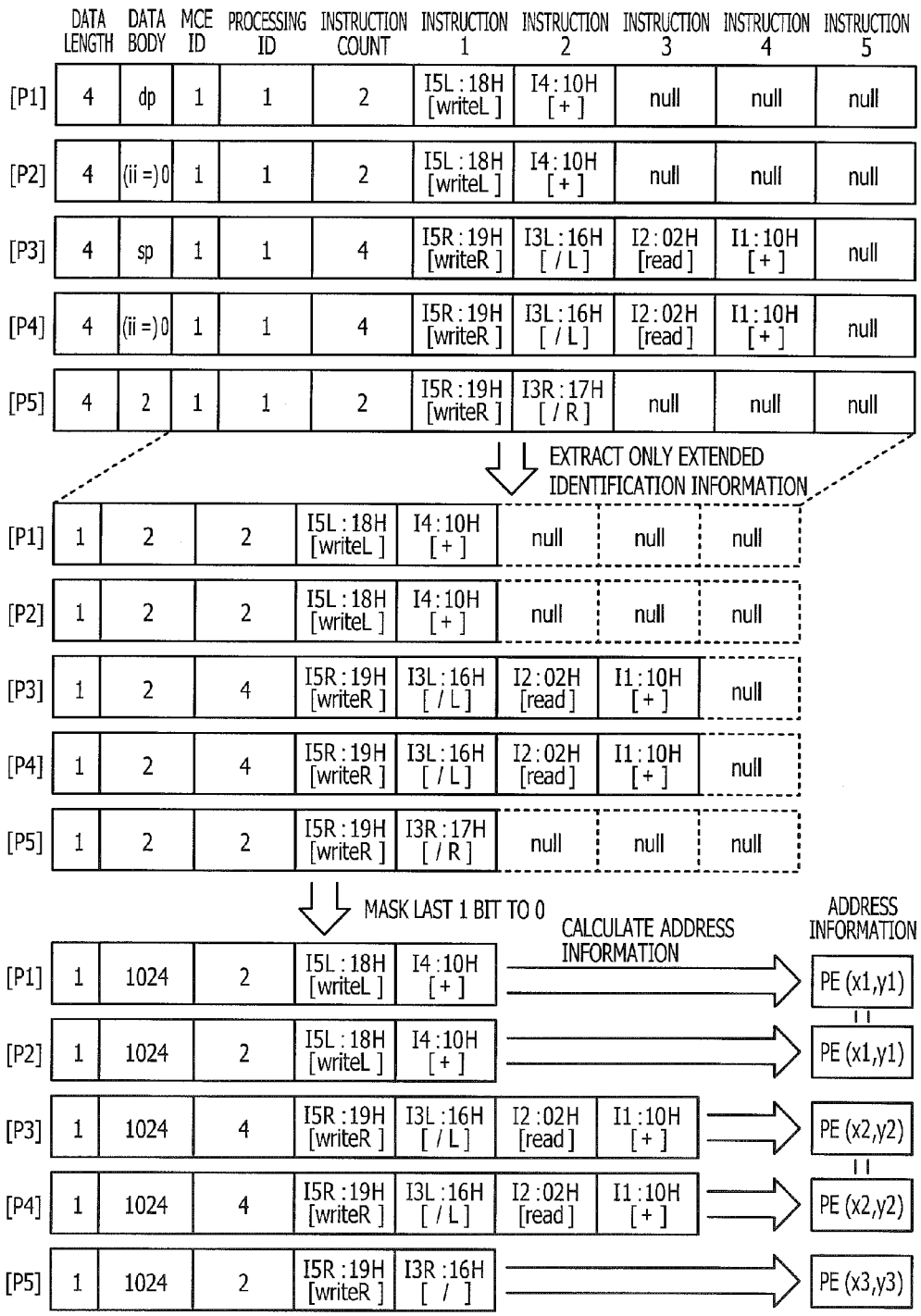
FIG. 9 is a diagram illustrating a method for calculating address information according to an embodiment of the present invention.
Figure 10:
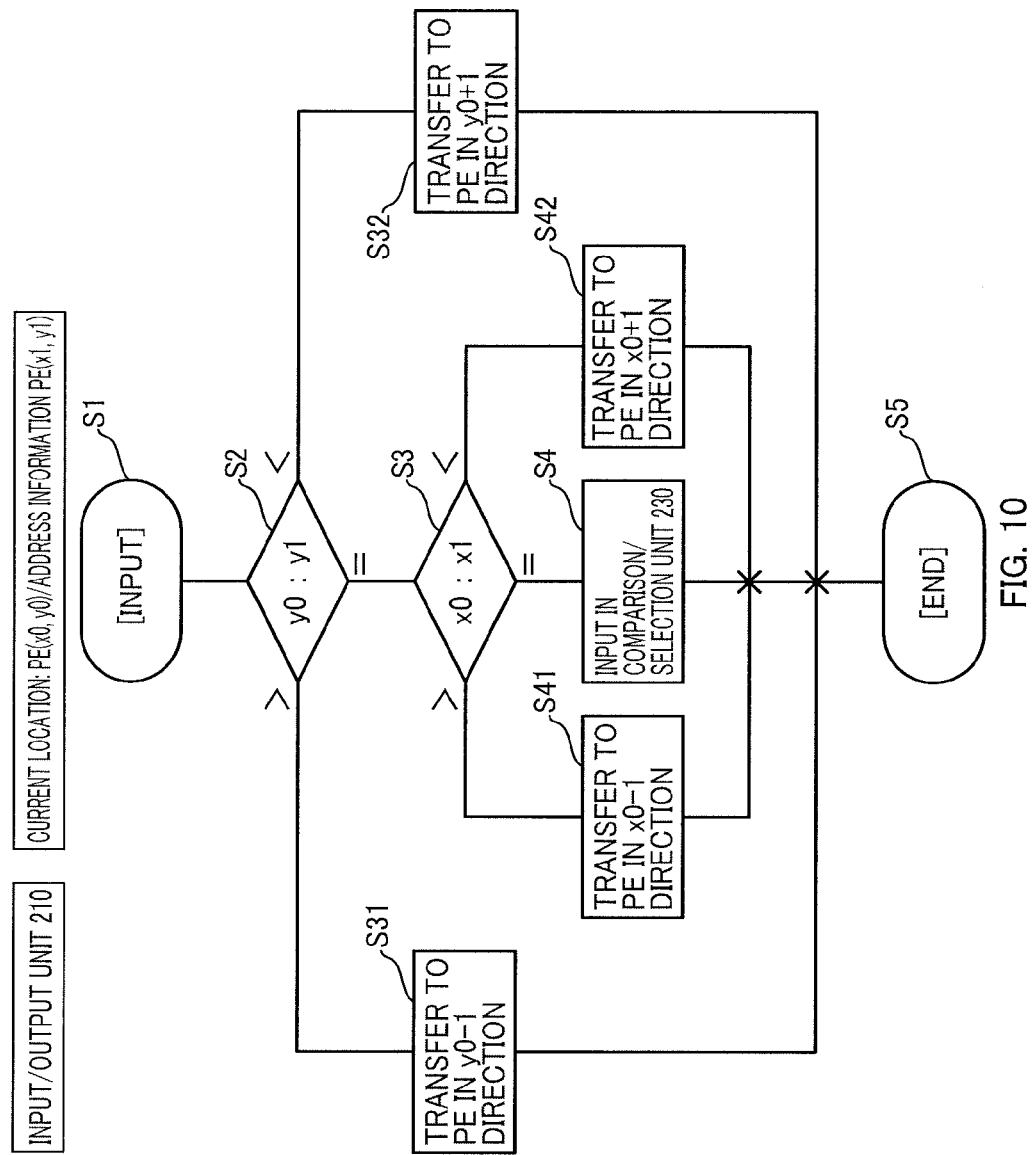
FIG. 10 is a flowchart illustrating an example of an operation of an input/output unit.

The address information calculation unit 211 first extracts only the extended identification information section from each packet (middle stage in FIG. 9) and masks the right-and-left information of the instruction to be executed first in each extended identification information (lower stage in FIG. 9). As described above, in an embodiment of the present invention, the instruction to be executed first is arranged at the end of the packet, and the LSB of each instruction is allocated exclusively for the right-and-left information. Therefore, it is only necessary to mask the last 1 bit of the extended identification information by 0 or 1 (0 in FIG. 9). The extended identification information may include a null character, and in this case, it is only necessary to mask 1 bit immediately before the null character and thereafter.

The address information calculation unit 211 subsequently generates a pseudo random number on the basis of the masked extended identification information, and calculates the address information in accordance with the pseudo random number. For example, if a 4-bit value of 0 to 15 (0000 to 1111 in the binary notation) is obtained by calculation as the address information, the address information can be also expressed in the form of coordinates (X, Y) with higher 2 bits representing the X coordinate and lower 2 bits representing the Y coordinate similarly to the coordinates of PEs in FIG. 3. In the lower stage of FIG. 9, the address information is expressed in the form of the coordinates.

Since the pseudo random number has reproducibility unlike the physical random number, the same pseudo random number is generated from the packets with the same masked extended identification information, and the same address information is calculated. For example, as shown in the lower stage of FIG. 9, from the packets P1 and P2 including the same masked extended identification information, the same address information (x1, y1) is calculated. Similarly, from the packets P3 and P4, the same address information (x2, y2) is calculated.

As described above, each packet can be encoded as appropriate, but it is preferable that the data section and the extended identification information section are individually encoded so that there is no need for decoding each time the address information is calculated. Similarly, if the processing instruction section is encoded by itself or the extended identification information section is encoded as a whole, it is preferable to use such encoding that can mask the right-and-left information of the instruction to be executed first without decoding.

Also, a known method can be used for the generation of the pseudo random number. From the viewpoint of calculation time for the address information, a high-speed generation method such as LCG (Linear Congruential Generator) or LFSR (Linear Feedback Shift Register) is preferably used.

Moreover, the address information calculation unit 211 may be so configured as to calculate the address information by referring to a pseudo random number table generated in advance. In this case, since the address information calculation unit 211 does not need to generate the pseudo random number for each packet, the calculation time for the address information can be reduced. In such a configuration, it is necessary that the address information calculation unit of each PE includes the same pseudo random number table or the common pseudo random number table is read by the address information calculation unit of each PE.

On the other hand, from the viewpoint of efficiency in the use of the PE, it is preferable that distribution of the pseudo random numbers is as uniform as possible so that the packet distribution becomes uniform. Also, if a random variable group is unpredictable, it is equal to uniform distribution, and thus, the efficiency in the use of the PE can be improved by using CSPRNG (Cryptographically Secure Pseudo-Random Number Generator). However, processing time for each packet varies with the instruction as well, and therefore even if the pseudo random numbers are distributed uniformly, the packet distribution might not become uniform.

Thus, it is preferable to use a pseudo random number with nearly uniform distribution to such an extent that the calculation time for the address information does not become too long. For example, it is not preferable that the calculation time for the address information is longer than the calculation time for a hash value, which will be described later.

The input/output unit 210 subsequently determines whether or not the address information of the packet indicates the PE, and if it indicates the PE, the packet is obtained and inputted to the comparison/selection unit 230. On the other hand, if the address information of the packet does not indicate the PE, the packet is transferred to the PE which is adjacent in a direction getting closer to the PE indicated by the address information. Here, an example of a specific operation of the input/output unit 210 in order to realize such obtainment and transfer of the packet will be described referring to FIG. 10. In FIG. 10, a current location, that is, the coordinates of the PE are set to (x0, y0), and the coordinates of the PE indicated by the address information are set to (x1, y1).

When the packet is inputted from the adjacent PE or MCE (S1), the input/output unit 210 compares the Y coordinate y0 of the current location with the Y coordinate y1 of the address information (S2).

If the two Y coordinates coincide at S2 (S2: =), the X coordinate of the current location x0 is compared with the X coordinate x1 of the address information (S3).

Also, if y0 is greater than y1 (S2: >), since the PE indicated by the address information is located in such a direction that the Y coordinate is smaller than the current location, the packet is transferred to the PE which is adjacent in the direction of y0−1, that is, the PE located at the coordinates (x0, y0−1) (S31), and the processing is finished (S5). On the other hand, if y0 is smaller than y1 (S2: <), since the PE indicated by the address information is located in such a direction that the Y coordinate is greater than the current location, the packet is transferred to the PE which is adjacent in the direction of y0+1, that is, the PE which is located at the coordinates (x0, y0+1) (S32), and the processing is finished (S5).

If the two X coordinates coincide at S3 (S3: =), since the address information indicates the PE, the packet is obtained and inputted to the comparison/selection unit 230 (S4), and the processing is finished (S5).

Also, if x0 is greater than x1 (53: >), since the PE indicated by the address information is located in such a direction that the X coordinate is smaller than the current location, the packet is transferred to the PE which is adjacent in the direction of x0−1, that is, the PE which is located at the coordinates (x0−1, y0) (S41), and the processing is finished (S5). On the other hand, if x0 is smaller than x1 (S3: <), since the PE indicated by the address information is in such a direction that the X coordinate is greater than the current location, the packet is transferred to the PE which is adjacent in the direction of x0+1, that is, the PE which is located at the coordinates (x0+1, y0) (S42), and the processing is finished (S5).

When the input/output unit of each PE performs the above described operation, each packet is transmitted to the PE indicated by the address information and obtained. For example, in FIG. 3, if the address information of the packet issued from the MCE 301 to the PE 101 indicates the PE 115, the packet is transmitted to the PE 115 through the PE 102, the PE 103, the PE 107, and PE 111. Also, for example, if the address information of the packet processed by the PE 115 and newly generated indicates the PE 104, the packet is transmitted to the PE 104 through the PE 114, the PE 113, the PE 112, and the PE 108.

That is, each packet first moves vertically in FIG. 3 until the Y coordinate coincides with the PE indicated by the address information, and then moves horizontally in FIG. 3 until the X coordinate coincides with the same. By employing such a movement rule, the moving path of the packet becomes the shortest all the time. Also, the direction is changed once or 0 times during the movement and frequency in use of the communication channel 500 between PEs can be averaged.

As mentioned above, though, in the data processing apparatus according to an embodiment of the present invention, the PE corresponding to the execution node is arranged in a matrix manner as in the case of the tile processor, it is greatly different from the EDGE architecture in such a point that the packet to be processed is dynamically arranged on the basis of the bit string thereof itself.

The data processing apparatus of the present invention is not limited to an arrangement and connection in a matrix manner shown in an embodiment of the present invention. For example, in FIG. 3, by omitting a part of the communication channel 500 between PEs, a ring-type connection can be obtained. Also, for example, all the PEs and the PE and MCE can be directly connected to each other. In this case, in the case of transmission of an electric signal by electric wiring, the greater the number of PEs or MCEs becomes, the more difficult the wiring becomes. On the other hand, in the case of the information transmission using the above-described electromagnetic wave, the communication channel 500 can be easily added.

The comparison/selection unit 230 inputs, to the ALU 260, the packets that can be processed in the packets obtained by the input/output unit 210 (hereinafter referred to as obtained packets). Also, the comparison/selection unit 230 stores, in the buffer memory 240, the packets that cannot be processed and reads the packets stored in the buffer memory 240 (hereinafter referred to as stored packets).

More specifically, if the instruction (at the end) to be executed first of the obtained packets is the one-input/one-output instruction, the comparison/selection unit 230 inputs only the obtained packets to the ALU 260 through the operand buffer 250a or 250b.

On the other hand, if the instruction (at the end) to be executed first of the obtained packet is the two-input/one-output instruction, the comparison/selection unit 230 searches a packet of which the above masked extended identification information coincides with that of the obtained packet from the stored packets. If there is a stored packet that coincides therewith, the comparison/selection unit 230 allows the two coinciding packets to be paired and inputs the packets to the ALU 260 through the operand buffer 250a and 250b. Also, if there is no stored packet that coincides therewith, the comparison/selection unit 230 stores the obtained packet in the buffer memory 240.

In order to efficiently search a stored packet of which masked extended identification information coincides with that of the obtained packet, in an embodiment of the present invention, the buffer memory 240 includes a hash table. Also, in the comparison/selection unit 230, the hash value calculation unit 231 calculates a hash value from the obtained packet. The hash value is calculated on the basis of the masked extended identification information of the obtained packet similarly to the case of the address information. Then, if the obtained packet is stored in the buffer memory 240, the comparison/selection unit 230 associates the obtained packet with the hash value, to be stored in the hash table.

As for the hash table, a known implementation method can be used. FIG. 11 shows an example of a hash table to be implemented in the buffer memory 240. In this hash table, as a method of resolving hash collision, an open addressing method is used and as a rehashing procedure, a linear probing method is used.

In FIG. 11, as an example, a case where after a packet 1 having the hash value of n+3 is stored, packets 2 to 5 each having the hash value of n are stored is shown. The packet 1 is stored at a location of an element n+3 of the root array [256], and a flag "1" and a count value "1" are set. Also, the packets 2 to 5 are stored at locations of the elements n, n+1, n+2, and n+4, respectively, and the flag "1" and the count value "4" are set at the location of the element n.

The ALU 260 performs an arithmetic operation (integer arithmetic and/or floating-point arithmetic) and a logical operation for the operand inputted through the operand buffers 250a and 250b, and outputs an operation result. More specifically, the ALU 260 executes an instruction (at the end) to be executed first with respect to the data of the inputted packet, generates a new packet by adding the extended identification information excluding the executed instruction to the data of the execution result, and inputs the new packet to the input/output unit 210 again.

As mentioned above, each PE acquires the address information from the extended identification information section of the inputted packet, obtains only the packet including the address information that indicates the PE, and transfers, to other PEs, the packet including the address information that does not indicate the PE. Then, an instruction (at the end) to be executed first is executed with respect to the data of the obtained packet, a new packet is generated by adding the extended identification information not including the executed instruction to the data of the execution result, and the generated packet is transferred or obtained in accordance with the address information thereof.

Instead of the calculation of the address information by each PE each time the packet is inputted thereto, the address information may be reused by adding the calculated address information to the packet. For example, the calculated address information is added in a case where the MCE issues the packet to the PE and a case where the PE generates a new packet, so that the added address information can be used as it is in other cases. In this case, there is no need to calculate the address information with respect to the packet with the address information added thereto, and the address information added to the packet that is obtained at each PE is identical, and thus the address information may be added to either of the data section or the extended identification information section.

Also, in the case of the information transmission using light, the light emitting element of the PE that is the information transmission source can directly transmit the packet to the PE indicated by the address information, without repeating of transfer, by emitting light having a wavelength that is set for the PE of the information transmission destination indicated by the address information. In this case, each PE can obtain only the packet including the address information that indicates the PE, without determining whether or not the address information of the packet inputted from another PE or MCE indicates the PE.

Moreover, the packet newly generated by each PE may also be configured such that light, having the wavelength that is set for the PE which is the information transmission destination indicated by the address information, is emitted without determination of whether or not the address information indicates the PE. In this case, the light receiving element of any of the PEs including the same PE as that of the information transmission source can receive the light of the wavelength and transmit the packet to the PE indicated by the address information.

Specific Example of Operation of Data Processing Apparatus

Figure 12:
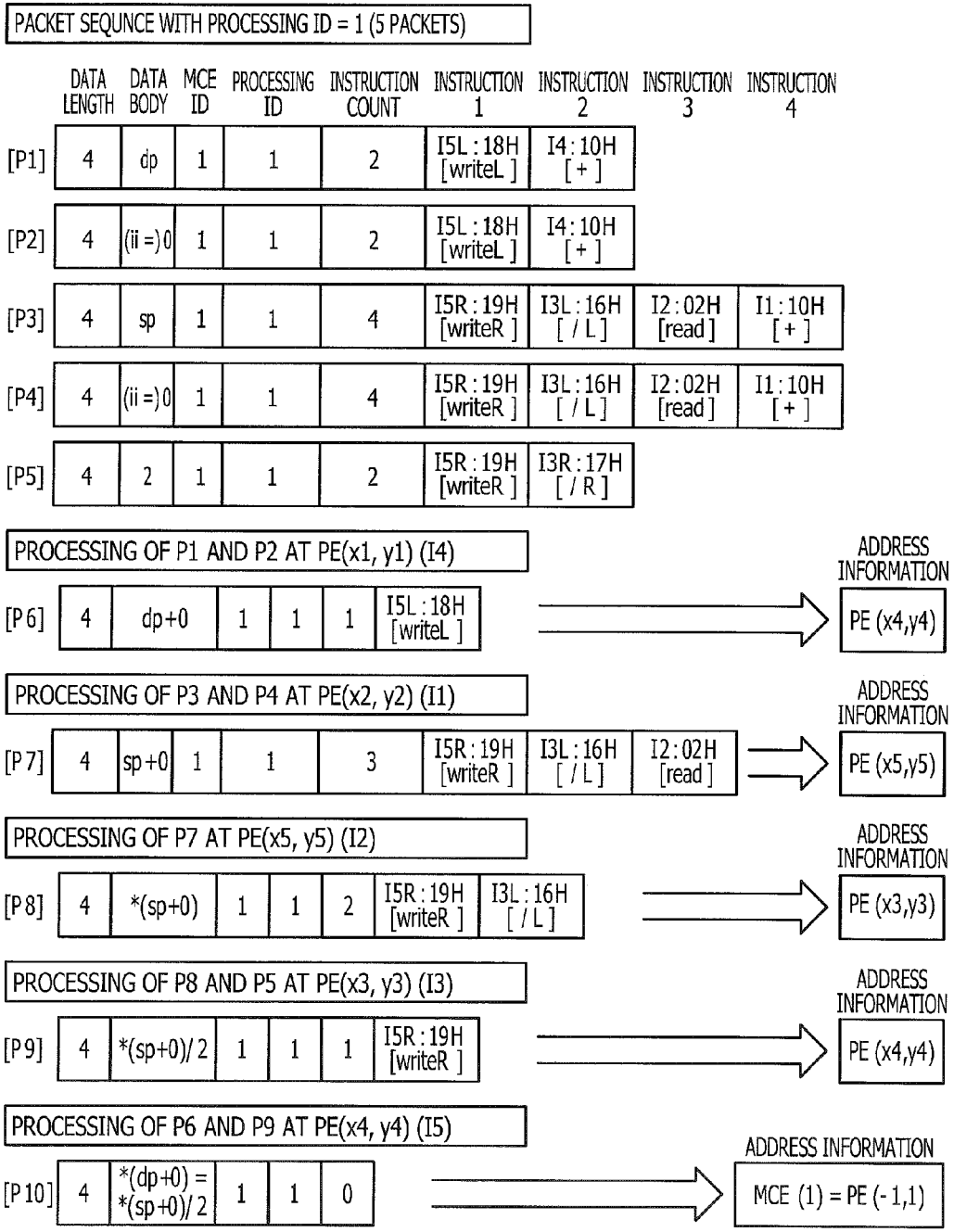
FIG. 12 is a diagram illustrating an operation of a data processing apparatus according to an embodiment of the present invention.

Here, referring to FIG. 12, a description will be given of a specific example of an operation of the data processing apparatus 1 for the packets P1 to P5 shown in FIG. 9.

As mentioned above, with respect to the packets P1 and P2, since the same address information (x1, y1) has been calculated, the packets P1 and P2 are transmitted to the PE located at the coordinates (x1, y1), and the addition instruction 14 at the end is executed. Then, the extended identification information not including the addition instruction 14 is added to the data dp+0 of the execution result, and a new packet P6 is generated. It is assumed that the address information calculated from the packet P6 is (x4, y4).

Similarly, with respect to the packets P3 and P4, since the same address information (x2, y2) has been calculated, the packets P3 and P4 are transmitted to the PE located at the coordinates (x2, y2) and the addition instruction I1 at the end is executed. Then, the extended identification information not including the addition instruction I1 is added to the data sp+0 of the execution result, and a new packet P7 is generated. It is assumed that the address information calculated from the packet P7 is (x5, y5).

The packet P7 is transmitted to the PE located at the coordinates (x5, y5), and the reading instruction 12 (one-input/one-output instruction) at the end is executed. Then, the extended identification information not including the reading instruction 12 is added to the data *(sp+0) of the execution result, and a new packet P8 is generated. Since the masked extended identification information of the packet P8 is the same as that of the packet P5, the same address information (x3, y3) as that of the packet P5 is calculated.

The packets P8 and P5 are transmitted to the PE located at the coordinates (x3, y3), and the division instruction 13 at the end is executed. Then, the extended identification information not including the division instruction 13 is added to the data *(sp+0)/2 of the execution result, and a new packet P9 is generated. Since the masked extended identification information of the packet P9 is the same as that of the packet P6, the same address information (x4, y4) as that of the packet P6 is calculated.

The packets P6 and P9 are transmitted to the PE located at the coordinates (x4, y4), and the writing instruction I5 at the end is executed. Then, the extended identification information not including the writing instruction 15 is added to the data *(dp+0)=*(sp+0)/2 of the execution result, and a new packet P10 is generated.

Since the packet P10 does not include a processing instruction, it is returned to the MCE 301 indicated by the MCE ID. In order to return the packet P10 to the MCE 301, the input/output unit of each PE is required to execute exceptional processing. In FIG. 12, as an example, the address information calculation unit 211 calculates the address information of the packet not including the processing instruction as (−1, m). Here, assuming that MCE ID=m. In this case, the address information of the packet P10 is (−1, 1). For example, in FIG. 3, if the PE 115 generates the packet P10, the packet P10 is transmitted to the MCE 301 through the PE 114, PE 113, PE 109, PE 105, and PE 101.

If, in each PE, the buffer memory or the operand buffer is full and a state is busy where the obtained packet cannot be processed, it is also preferable that the packet is returned to the MCE indicated by the MCE ID. In the exceptional processing in this case, it is only necessary that, for example, the instruction count information of the packet is set to a value greater than the maximum instruction count and the address information of such a packet is also calculated as (−1, m). Moreover, while any of the PEs is in such a busy state, each MCE preferably stops issuance of a packet of a new processing ID. In order to control the busy state, it is only necessary that a control signal line connected to all the PEs and MCEs is provided, for example, and a busy signal indicating the busy state is transmitted through the control signal line.

Another Specific Example of Operation of Data Processing Apparatus

The configuration of the packet shown in FIG. 7 can include only up to five instructions in the processing instruction section. Thus, in order to perform more complicated processing, an instruction is required to be added to the processing instruction section of the packet.

The instruction addition instruction (symbol/hexadecimal notation: "app2L"/52H, "app2R"/53H) shown in FIG. 5 can realize such an addition function of an instruction. A specific example of an operation of the data processing apparatus 1 including execution of the instruction addition instruction will be described hereinafter referring to FIGS. 16 to 18, as appropriate. Here, as an example, a description will be given of processing in which such a value is stored in the array dp[1024] as to be obtained by multiplying each element in the array sp[1024] by 4, adding 1 to the multiplied element, and dividing such an added element by 2.

Figure 16:
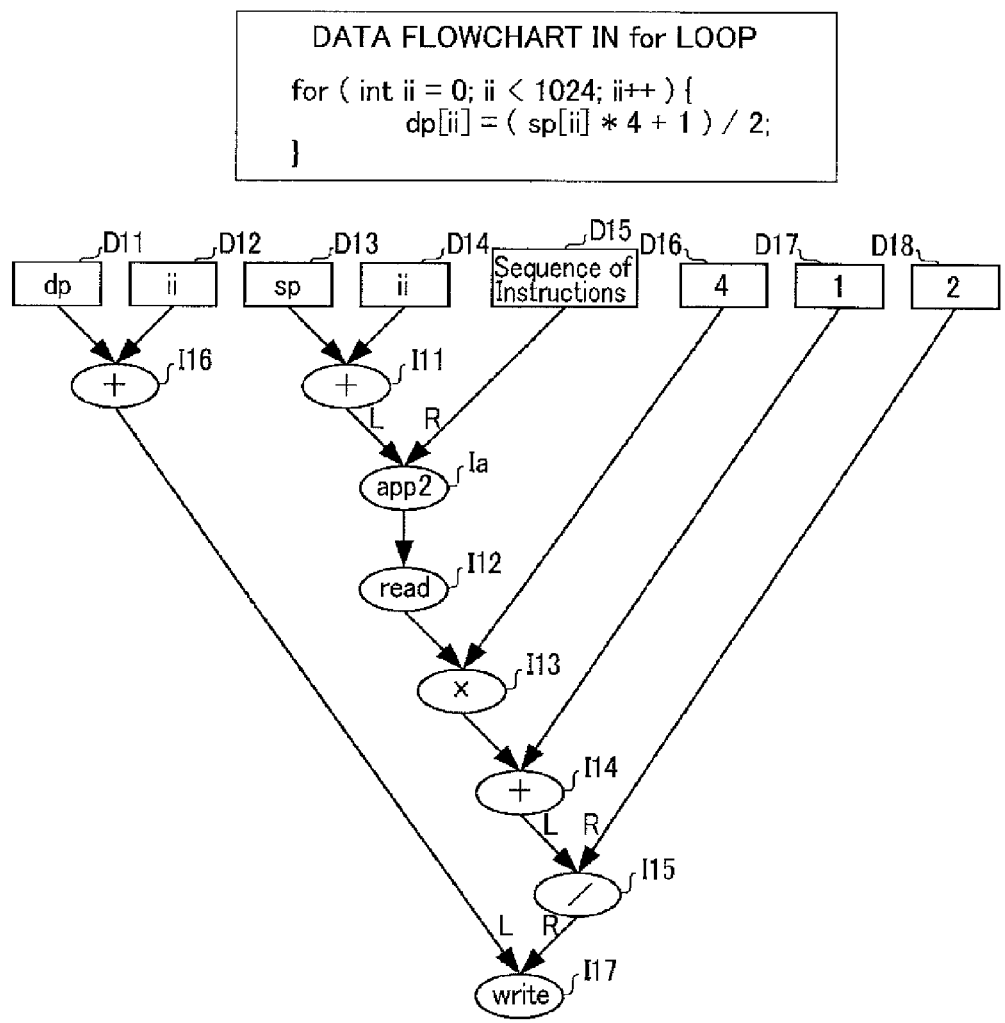
FIG. 16 is a diagram illustrating an example of a data flowchart including execution of an instruction addition instruction.

FIG. 16 shows a data flowchart corresponding to processing in the for loop of such processing.

In FIG. 16, D11 to D18 indicate data, Ia indicates an instruction addition instruction, and I11 to I17 indicate instructions other than the instruction addition instruction. The addition instruction I16 adds the data D11 (dp) and the data D12 (ii) and outputs the data dp+ii, while the addition instruction I11 adds the data D13 (sp) and the data D14 (ii) and outputs the data sp+ii.

The data D15 is a sequence of instructions and the instruction addition instruction Ia adds the data D15 to the processing instruction section of the packet of the data sp+ii. The sequence of instructions of the data D15 corresponds to the processing of the instruction addition instruction Ia and thereafter with respect to the packet of the data sp+ii, and more specifically, corresponds to the instructions I12 to I15 and I17.

In the instructions added by the instruction addition instruction Ia, first, reading instruction I12 reads the data *(sp+ii) from the storage device 6.

Subsequently, a multiplication instruction I13 multiplies the data *(sp+ii) by the data D16(4) and outputs the data *(sp+ii)*4.

Subsequently, an addition instruction I14 adds the data D17(1) to the data *(sp+ii)*4 and outputs the data *(sp+ii)*4+1.

Subsequently, a division instruction I15 divides the data *(sp+ii)*4+1 by the data D18(2) and outputs the data [*(sp+ii)*4+1]/2.

Lastly, a writing instruction I17 writes the data [*(sp+ii)*4+1]/2 in the data *(dp+ii) of the storage device 6.

Through the above data flow, such a value is stored in the array dp[1024] as to be obtained by multiplying one element in the array sp[1024] by 4, adding 1 to the multiplied element, and dividing such an added element by 2. FIG. 17 shows the first eight packets P11 to P18 in which the MCE ID=1 and the processing ID=1 in the sequences of packets after expansion of the for loop with respect to the base packet sequences generated on the basis of the data flow-chart shown in FIG. 16.

Here, referring to FIG. 18, a specific example of an operation of the data processing apparatus 1 with respect to the packets P11 to P18 shown in FIG. 17 will be described.

With respect to the packets P11 and P12, since the same address information is calculated, the packets P11 and P12 are transmitted to the PE indicated by the same address information, and the addition instruction I16 at the end is executed. Then, the extended identification information not including the addition instruction I16 is added to the data dp+0 of the execution result, and a new packet P19 is generated.

Similarly, with respect to the packets P13 and P14, since the same address information is calculated, they are transmitted to the PE indicated by the same address information, and the addition instruction I11 at the end is executed. Then, the extended identification information not including the addition instruction I11 is added to the data sp+0 of the execution result, and a new packet P20 is generated. Since the packet P20 has the same extended identification information as that of the packet P15, the same address information as that of the packet P15 is calculated.

The packets P20 and P15 are transmitted to the PE indicated by the same address information, and the instruction addition instruction Ia at the end is executed. Then, the extended identification information, in which the instruction addition instruction Ia is removed from the processing instruction section and then the data D15 is added, is added to the data sp+0 of the packet P20, and a new packet P21 is generated.

The packet P21 is transmitted to the PE indicated by the calculated address information and the reading instruction I12 (one-input/one-output instruction) at the end is executed. Then, the extended identification information not including the reading instruction I12 is added to the data *(sp+0) of the execution result, and a new packet P22 is generated. Since the packet P22 has the same masked extended identification information as that of the packet P16, the same address information as that of the packet P16 is calculated.

The packets P22 and P16 are transmitted to the PE indicated by the same address information, and the multiplication instruction I13 at the end is executed. Then, the extended identification information not including the multiplication instruction I13 is added to the data *(sp+0)*4 of the execution result, and a new packet P23 is generated. Since the packet P23 has the same masked extended identification information as that of the packet P17, the same address information as that of the packet P17 is calculated.

The packets P23 and P17 are transmitted to the PE indicated by the same address information, and the addition instruction I14 at the end is executed. Then, the extended identification information not including the addition instruction I14 is added to the data *(sp+0)*4+1 of the execution result, and a new packet P24 is generated. Since the packet P24 has the same masked extended identification information as that of the packet P18, the same address information as that of the packet P18 is calculated.

The packets P24 and P18 are transmitted to the PE indicated by the same address information, and the division instruction I15 at the end is executed. Then, the extended identification information not including the division instruction I15 is added to the data [*(sp+0)*4+1]/2 of the execution result, and a new packet P25 is generated. Since the packet P25 has the same masked extended identification information as that of the packet P19, the same address information as that of the packet P19 is calculated.

The packets P19 and P25 are transmitted to the PE indicated by the same address information, and the writing instruction I17 at the end is executed. Then, the extended identification information not including the writing instruction I17 is added to the data *(dp+0)=[*(sp+0)*4+1]/2 of the execution result, and a new packet P26 is generated. Since the packet P26 does not include the processing instruction, it is returned to the MCE 301 indicated by the MCE ID.

By means of the execution of the writing instruction I17, specifically, the data [*(sp+0)*4+1]/2 of the packet P25 is written in the data *(dp+0) that is stored at the address of the storage device 6 indicated by the data dp+0 of the packet P19. Therefore, the data *(dp+0)=[*(sp+0)*4+1]/2 of the packet P26 indicates the execution itself of the writing instruction I17. Thus, after the execution of the writing instruction I17, the packet P26 may be extinguished without being returned to the MCE 301.

As such, by executing the instruction addition instruction shown in FIG. 5, an instruction can be added to the processing instruction section of the packet. Similarly, by executing the data addition instruction (symbol/hexadecimal notation; "app1L"/50H, "app1R"/51H) shown in FIG. 5, data can also be added to the data section of the packet.

Another Configuration Example of Packet

Figure 19:
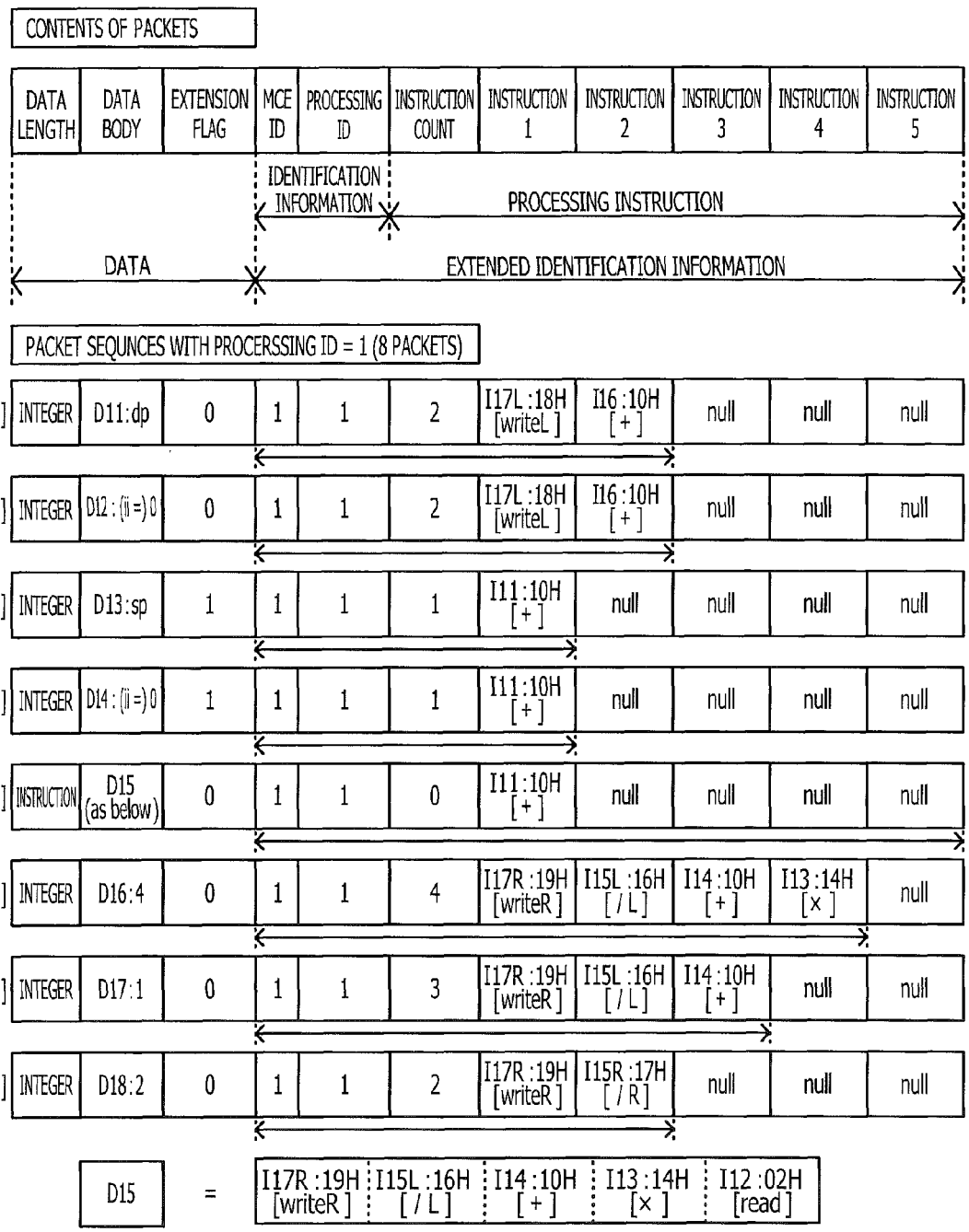
FIG. 19 is a diagram illustrating another configuration example of a packet processed by a data processing apparatus.

In FIG. 7, shown is the configuration of the packet processed by the data processing apparatus 1, but it is not limited to that. Here, another configuration example of the packet processed by the data processing apparatus 1 is shown in FIG. 19. FIG. 19 shows packets P31 to P38, with which the same execution result as that of the packets P11 to P18 shown in FIG. 17 can be obtained.

In FIG. 19, the extended identification information section has the same configuration as that shown in FIG. 7. However, each PE does not remove the executed instruction from the extended identification information section when generating a new packet. In this case, the instruction that should be executed first might not be arranged at the end, and thus the instruction count information becomes information indispensable for indicating the number of unprocessed instructions and the instruction that should be executed first.

Figure 20:
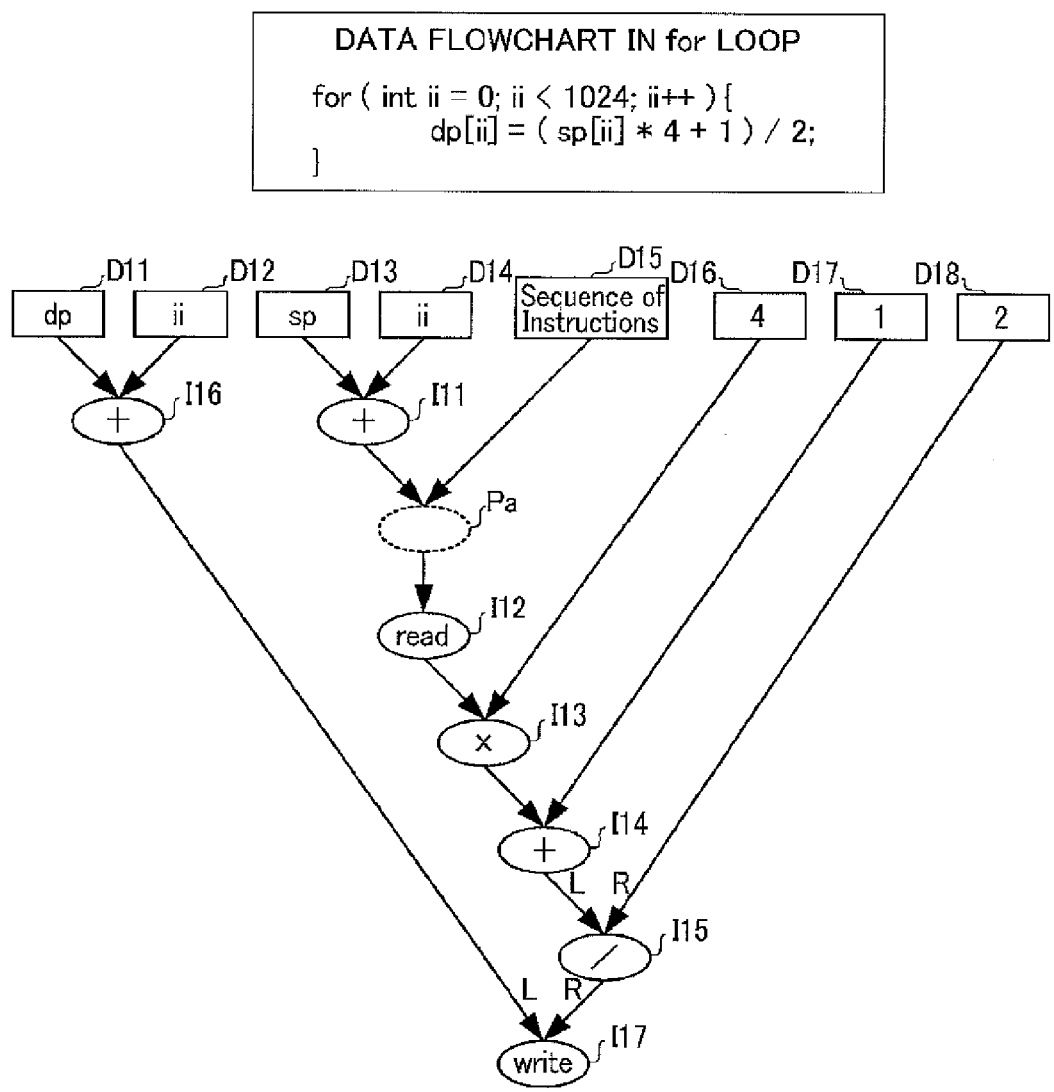
FIG. 20 is a diagram illustrating an example of a data flowchart including instruction addition processing.

On the other hand, the data section includes not only the data body but also data type information and extension flag of the data. Further, the data type information indicates the data type such as an "integer type" or a "floating-point type", for example, and by setting a data length in advance for each data type, a function of data length information can also be realized. Furthermore, by providing an "instruction type" as the data type, an instruction addition function can be realized, as will be described later. FIG. 20 shows a data flowchart in the configuration of the packet, wherein the instruction addition function is realized by instruction addition processing Pa without using the instruction addition instruction Ia. The extension flag is used in the instruction addition processing Pa.

Further, in FIG. 19, the packets P31, P32, and P36 to P38 have their data bodies and the extended identification information sections coinciding with those of the packets P11, P12, and P16 to P18 shown in FIG. 17. In all these packets, the data type information is the "integer type" and the extension flag is set to "0".

The packets P33 and P34 are obtained by removing the instruction addition instruction IaL from the packets P13 and P14 and setting the instruction count information at "1".

Further, in order to indicate the side to which the instruction is added in the processing instruction section in the instruction addition processing Pa instead of the instruction addition instruction IaL, the extension flag is set at "1". In all these packets, the data type information is the "integer type".

The packet P35 includes the same processing instruction as those of the packets P33 and P34 instead of the instruction addition instruction IaR, and in order to indicate the side to which the instruction is to be added in the instruction addition processing Pa, the data type information is set at the "instruction type". However, since the same processing instruction as those of the packets P33 and P34 is not to be processed for the data D15 of the packet P35, the instruction count information is set at "0". In the packet P35, the extension flag is set at "0".

In FIG. 19, a portion, to be used when the address information is calculated and when the obtained packet and the stored packet are compared, is shown in a range indicated by an arrow for each packet. For example, in the packets P31 to P34 and P36 to P38, only the unprocessed instruction indicated by the instruction count information is extracted in the identification information section and the processing instruction section, the right-and-left information which is the instruction to be executed first is masked, and the calculation of the address information and the like are performed. Therefore, in these packets, similarly to the case where the executed instruction is removed from the extended identification information section when generating a new packet, the calculation of the address information and the like are performed.

However, in the packet P35 whose data type information is the "instruction type" and the packet in which the extension flag is set at "1", if the instruction count information is "0", the calculation of the address information and the like are performed on the basis of the entire extended identification information section.

Here, referring to FIG. 21, a specific example of an operation of the data processing apparatus 1 with respect to the packets P31 to P38 shown in FIG. 19 will be described.

With respect to the packets P31 and P32, since the same address information is calculated, they are transmitted to the PE indicated by the same address information, and the addition instruction I16 to be executed first, which is indicated by the instruction count information, is executed. Then, the extended identification information, which is obtained by subtracting 1 from the instruction count information, is added to the data dp+0 of the execution result, and a new packet P39 is generated. In the packet P39, since the instruction count information is set at "1", the remaining addition instruction I16 is not used for the calculation of the address information.

Similarly, with respect to the packets P33 and P34, since the same address information is calculated, they are transmitted to the PE indicated by the same address information, and the addition instruction I11 to be executed first, which is indicated by the instruction count information, is executed. Then, the extended identification information, which is obtained by subtracting 1 from the instruction count information, is added to the data sp+0 of the execution result, and a new packet P40 is generated. In the packet P40, since the extension flag is set at "1" and the instruction count information is set at "0", the same address information as that of the packet P35 is calculated on the basis of the entire extended identification information section.

The packets P40 and P35 whose instruction count information is "0" for both are transmitted to the PE indicated by the same address information, and the instruction addition processing Pa is executed. And the extended identification information, allowing the processing instruction section to be the data D15 of the packet P35 whose data type information is the "instruction type", is added to the data sp+0 of the packet P40 with the extension flag set at "1", and a new packet P41 is generated.

The instruction count information of the packet P41 has the instruction count "5" included in the data D15. Further, the extension flag of the packet P41 inherits the extension flag "0" of the packet P35. On the other hand, by setting "1" to the extension flag of the packet whose data type information is the "instruction type", the instruction addition processing can also be executed for the packet that is newly generated by the instruction addition processing.

The packet P41 is transmitted to the PE indicated by the calculated address information, and the reading instruction I12 (one-input/one-output instruction) indicated by the instruction count information to be executed first is executed. Then, the extended identification information obtained by subtracting 1 from the instruction count information is added to the data *(sp+0) of the execution result, and a new packet P42 is generated. In the packet P42, since the instruction count information is set at "4", the remaining reading instruction I12 is not used for calculation of the address information, and the same address information as that of the packet P36 is calculated.

The packets P42 and P36 are transmitted to the PE indicated by the same address information, and the multiplication instruction I13 to be executed first, which is indicated by the instruction count information, is executed. Then, the extended identification information obtained by subtracting 1 from the instruction count information is added to the data *(sp+0)*4 of the execution result, and a new packet P43 is generated. In the packet P43, since the instruction count information is set at "3", the remaining multiplication instruction I13 and the reading instruction I12 are not used for calculation of the address information, and the same address information as that of the packet P37 is calculated.

The packets P43 and P37 are transmitted to the PE indicated by the same address information, and the addition instruction I14 to be executed first, which is indicated by the instruction count information, is executed. Then, the extended identification information obtained by subtracting 1 from the instruction count information is added to the data *(sp+0)*4+1 of the execution result, and a new packet P44 is generated. In the packet P44, since the instruction count information is set at "2", the remaining addition instruction I14, the multiplication instruction I13, and the reading instruction I12 are not used for calculation of the address information, and the same address information as that of the packet P38 is calculated.

The packets P44 and P38 are transmitted to the PE indicated by the same address information, and the division instruction I15 to be executed first, which is indicated by the instruction count information, is executed. Then, the extended identification information obtained by subtracting 1 from the instruction count information is added to the data [*(sp+0)*4+1]/2 of the execution result, and a new packet P45 is generated. In the packet P45, since the instruction count information is set at "1", the remaining division instruction I15, the addition instruction I14, the multiplication instruction I13, and the reading instruction I12 are not used for calculation of the address information, and the same address information as that of the packet P39 is calculated.

The packets P39 and P45 are transmitted to the PE indicated by the same address information, and the writing instruction I17 to be executed first, which is indicated by the instruction count information, is executed. Then, the extended identification information obtained by subtracting 1 from the instruction count information is added to the data *(dp+0)=[*(sp+0)*4+1]/2 of the execution result, and a new packet P46 is generated. In the packet P46, the data type information is not the "instruction type" or the extension flag is not set at "1" but the instruction count information is set at "0", Therefore, the packet P46 does not include the processing instruction to be processed, it is returned to the MCE 301 indicated by the MCE ID or extinguished.

As such, without using the instruction addition instruction, an instruction can be added to the processing instruction section of the packet by executing the instruction addition processing Pa. Further, by executing the instruction addition instruction, an instruction can be added to the processing instruction section of the packet As described above, in the data processing apparatus 1, each MCE generates, for each piece of data, a packet to which the extended identification information including the processing instruction is added, each packet is obtained by the PE indicated by the address information determined in accordance with the extended identification information, the packet to be processed is arranged on the basis of a bit string thereof by the instruction of the packet being executed by the PE, and parallelism of the processing can be improved by using the existing software resources substantially as they are.

Further, since the address information is dynamically determined in accordance with the extended identification information, the packet to be processed is dynamically arranged on the basis of the bit string thereof, and the parallelism of the processing can be further improved.

Furthermore, since the pseudo random numbers are generated on the basis of the extended identification information and the address information is calculated in accordance with the pseudo random numbers, the packet distribution is brought closer to uniform distribution, and efficiency in the use of the PE can be improved.

Furthermore, by transferring the packet, whose address information does not indicate the PE, to another PE, the packet can be transmitted to the PE indicated by the address information.

Furthermore, each PE executes an instruction to be executed first in the obtained packet, and changes an instruction, to be executed subsequently to the executed instruction in the extended identification information, into an instruction to be executed first, so that a new packet can be generated by adding the extended identification information to the data of the execution result Furthermore, since each PE executes an instruction to be executed first in the obtained packet and removes the executed instruction from the extended identification information, a new packet can be generated by adding the extended identification information to the data of the execution result.

Furthermore, if there is a stored packet in which masked extended identification information coincides with the obtained packet, the two coinciding packets are paired and inputted to the ALU 260, while if there is no coinciding stored packets, the obtained packet is stored in the buffer memory 240 so that the two-input/one-output instruction for performing a binary operation can be executed.

Furthermore, if the instruction to be executed first in the obtained packet is the one-input/one-output instruction, by inputting only the obtained packet to the ALU 260, the one-input/one-output instruction for performing a unary operation can be executed.

Furthermore, in comparison between the extended identification information of the obtained packet and the extended identification information of the stored packet, by masking the right-and-left information of the instruction to be executed first, the two-input/one-output instruction for performing a binary operation, which is a non-commutative operation, can be executed.

Furthermore, since a bash value is calculated on the basis of the masked extended identification information of the obtained packet and the obtained packet is associated with the hash value and stored in a hash table, the stored packet, in which masked extended identification information coincides with the obtained packet, can be efficiently searched.

Furthermore, since a pseudo random number is generated on the basis of the masked extended identification information and the address information is calculated in accordance with the pseudo random number, the packets including the same masked extended identification information can be transmitted to the PE as well as the efficiency in the use of the PE can be improved.

Furthermore, since only the PEs adjacent to each other are connected, the problem of wiring delay can be avoided.

Furthermore, since the PEs are arranged in the matrix manner similarly to the tile processor and each PE transfers the packet to the PE which is adjacent in a direction getting closer to the PE indicated by the address information, the transfer pathway of the packet can be shortest, and the operation speed can be kept at a high speed even if the number of PEs is increased.

Furthermore, since each MCE sequentially generates sequences of packets from the executable code or the intermediate code stored in the storage device 6, an interpreter type processing system can be constructed.

Furthermore, since the packet not including the processing instruction to be processed is returned to the MCE indicated by the MCE ID, each MCE can complete processing of the processing ID of the packet and the processing ID can be used again.

Furthermore, since the data processing system including the data processing apparatus 1 is configured in which each MCE sequentially generates a packet, parallelism of the processing in an interpreter type parallel computer system can be improved.

Furthermore, as described above, in the configuration of the packet shown in FIG. 7 or 19, each packet is obtained by the PE indicated by the address information that is determined in accordance with the extended identification information; and the instruction is executed, so that the packet to be processed is arranged on the basis of bit string thereof; and the parallelism of the processing can be improved by using the existing software resources substantially as they are.

Furthermore, since the sequences of packets generated in advance from the source program P0 are recorded in a recording medium as the executable code P2, the executable code P2 can be used in a compiler type processing system.

Furthermore, since the sequences of packets generated in advance from the source program P0 are stored in the storage device 6 as the executable code P2, each MCE can read and use the executable code P2.

Furthermore, since the interim packet sequences, in which at least a part of the identification information section in the expanded-loop packet sequences is omitted (rendered as a null character), are recorded in a recording medium, after the MCE ID and the processing ID, which are omitted, are set in the interim packet sequences, they can be used in the compiler type processing system.

Furthermore, since the interim packet sequences, in which at least a part of the identification information section in the expanded-loop packet sequences is omitted (rendered as a null character), are recorded in the storage device 6, each MCE can read the interim packet sequences and use them after the omitted MCE ID and processing ID are set.

Furthermore, since a data processing system including the data processing apparatus 1 is configured in which each MCE reads the sequences of packets generated in advance, the parallelism of the processing in the compiler type parallel computer system can be improved.

Furthermore, as described above, each PE obtains the packet, whose address information determined in accordance with the extended identification information indicates the PE, in the packets, each including data and the extended identification information that includes the processing instruction is added to the data, and the PE executes the instruction, and thus, the packet to be processed is arranged on the basis of the bit string thereof, so that the parallelism of the processing can be improved with the existing software resources substantially being used as they are.

Furthermore, each PE can transmit the packet to the PE indicated by the address information by transferring the packet, in which address information does not indicate the PE, to another PE.

Furthermore, each PE executes the instruction to be executed first in the obtained packet, and generates a new packet by adding, to the data of the execution result, the extended identification information, in which the instruction to be executed subsequently to the executed instruction is changed into the instruction to be executed first, so that the new packet can also be dynamically arranged and the instruction can be executed.

The above embodiments of the present invention are simply for facilitating the understanding of the present invention and are not in any way to be construed as limiting the present invention. The present invention may variously be changed or altered without departing from its spirit and encompass equivalents thereof.

REFERENCE SIGNS LIST 1 data processing apparatus
6 storage device
7 input device
8 output device
9 bus
100 to 115 PE (processing element)
210 input/output unit
211 address information calculation unit
212 light emitting element
213 light receiving element
214a to 214d output port
215a to 215d input port
230 comparison/selection unit
231 hash value calculation unit
240 buffer memory
250a & 250b operand buffer
260 ALU (arithmetic logic unit)
300 to 303 MCE (memory control element)
400 cache memory
500 communication channel (transmission path)
501 transmission material (core)
502 reflection material (cladding)
503 absorbent material

The invention claimed is:

1. A data processing apparatus comprising:
a plurality of processors that process packets each including data and extended identification information added to the data, the extended identification information including identification information for identifying the data and instruction information indicating one or more processing instructions to the data; and
an address information calculator that calculates address information of a packet, wherein
each of the plurality of processors comprises:
an input/output unit that obtains, in the packets, only a packet whose address information indicates said each of the plurality of processors, and
an operation unit that executes the processing instruction in the packet obtained by the input/output unit,
the address information calculator calculates the address information in accordance with a pseudo random number generated from a bit string of the extended identification information.

2. A data processing method for processing packets each including data and extended identification information added to the data, the extended identification information including identification information for identifying the data and instruction information indicating one or more processing instructions to the data, the data processing method comprising:
calculating the address information in accordance with a pseudo random number generated from a bit string of the extended identification information;
obtaining, with each of a plurality of processors, only a packet whose address information indicates said each processor, in the packets; and
executing, with said each processor, the processing instruction in the packet.

* * * * *